(12) United States Patent
Onggosanusi et al.

(10) Patent No.: US 10,716,020 B2
(45) Date of Patent: Jul. 14, 2020

(54) METHOD AND APPARATUS FOR MEASUREMENT REFERENCE SIGNAL

(71) Applicant: Samsung Electronics Co., Ltd, Suwon-si (KR)

(72) Inventors: Eko Onggosanusi, Coppell, TX (US); Hoondong Noh, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 15/437,413

(22) Filed: Feb. 20, 2017

(65) Prior Publication Data

US 2017/0245165 A1 Aug. 24, 2017

Related U.S. Application Data

(60) Provisional application No. 62/298,643, filed on Feb. 23, 2016, provisional application No. 62/303,779, filed on Mar. 4, 2016, provisional application No. 62/358,225, filed on Jul. 5, 2016, provisional application No. 62/349,361, filed on Jun. 13, 2016, provisional application No. 62/417,616, filed on Nov. 4, 2016, provisional application No. 62/445,993, filed on Jan. 13, 2017.

(51) Int. Cl.
*H04W 24/08* (2009.01)
*H04L 5/00* (2006.01)

(52) U.S. Cl.
CPC ........... *H04W 24/08* (2013.01); *H04L 5/0048* (2013.01); *H04L 5/0057* (2013.01); *H04L 5/0094* (2013.01)

(58) Field of Classification Search
CPC .................................................. H04W 24/08

USPC ......................................................... 370/252
See application file for complete search history.

(56) References Cited

U.S. PATENT DOCUMENTS

| 2011/0216842 A1 | 9/2011 | Zhang et al. |
| 2013/0034064 A1 | 2/2013 | Nam et al. |
| 2013/0156014 A1 | 6/2013 | Kim et al. |
| 2013/0294366 A1 * | 11/2013 | Papasakellariou ........... H04W 72/0406 370/329 |

(Continued)

FOREIGN PATENT DOCUMENTS

| WO | 2014062029 A1 | 4/2014 | |
| WO | WO 2014/062029 A1 * | 4/2014 | ............ H04W 24/00 |

(Continued)

OTHER PUBLICATIONS

ISA/KR, "International Search Report," Application No. PCT/KR2017/002730, dated Jun. 22, 2017, 3 pages, Korean Intellectual Property Office, Daejeon, Korea.

(Continued)

*Primary Examiner* — Kodzovi Acolatse
*Assistant Examiner* — Abdeltif Ajid

(57) ABSTRACT

Methods and apparatuses for reference signal measurement. A user equipment (UE) includes a transceiver and a processor operably connected to the transceiver. The transceiver is configured to receive reference signal (RS) resource configuration information and at least two RSs. The processor is configured to measure at least one of the at least two RSs. A first RS of the at least two RSs is non-UE-specifically configured and a second RS of the at least two RSs is UE-specifically configured.

14 Claims, 19 Drawing Sheets

(56) References Cited

U.S. PATENT DOCUMENTS

| | | | |
|---|---|---|---|
| 2014/0044040 A1 | 2/2014 | Chen et al. | |
| 2014/0071902 A1 | 3/2014 | Sorrentino et al. | |
| 2014/0301238 A1* | 10/2014 | Chun .................. | H04B 7/0456 370/252 |
| 2015/0223213 A1 | 8/2015 | Moon et al. | |
| 2015/0237520 A1 | 8/2015 | Jongren et al. | |
| 2015/0304076 A1* | 10/2015 | Lee .................. | H04L 5/005 370/329 |
| 2016/0006546 A1* | 1/2016 | Yi .................... | H04L 5/0094 370/329 |
| 2016/0080121 A1 | 3/2016 | Kim et al. | |
| 2016/0309376 A1* | 10/2016 | Liu .................... | H04W 24/08 |
| 2017/0064675 A1* | 3/2017 | Kim .................. | H04B 7/068 |

FOREIGN PATENT DOCUMENTS

| | | | | |
|---|---|---|---|---|
| WO | WO-2014062029 A1 * | 4/2014 | .......... | H04L 5/0057 |
| WO | 2014182116 A1 | 11/2014 | | |
| WO | WO-2015100533 A1 * | 7/2015 | ........ | H04W 36/0055 |

OTHER PUBLICATIONS

ISA/KR, "Written Opinion of the International Searching Authority," Application No. PCT/KR2017/002730, dated Jun. 22, 2017, 9 pages, Korean Intellectual Property Office, Daejeon, Korea.

3GPP TS 36.213 v. 13.0.1, "3rd Generation Partnership Project; Technical Specification Group Radio Access Network; Evolved Universal Terrestrial Radio Access (E-UTRA); Physical layer procedures (Release 13)," Jan. 27, 2016, 226 pages.

Samsung, "SRS Triggering and DCI Format 3/3a size," R1-160545, 3GPP TSG RAN WGI #84, St. Julians, Malta, Feb. 5, 2016, 4 pages.

ISA/KR, "International Search Report," Application No. PCT/KR2017/001981, dated May 23, 2017, Korean Intellectual Property Office, 3 pages.

ISA/KR, "Written Opinion of the International Search Authority," Application No. PCT/KR2017/001981, dated May 23, 2017, Korean Intellectual Property Office, 6 pages.

3GPP TS 36.211 V12.4.0 (Dec. 2014) Technical Specification 3rd Generation Partnership Project; Technical Specification Group Radio Access Network; Evolved Universal Terrestrial Radio Access (E-UTRA); Physical channels and modulation (Release 12) 124 pages.

3GPP TS 36.212 V12.3.0 (Dec. 2014) Technical Specification 3rd Generation Partnership Project; Technical Specification Group Radio Access Network; Evolved Universal Terrestrial Radio Access (E-UTRA); Multiplexing and channel coding (Release 12) 89 pages.

3GPP TS 36.213 V12.4.0 (Dec. 2014) Technical Specification 3rd Generation Partnership Project; Technical Specification Group Radio Access Network; Evolved Universal Terrestrial Radio Access (E-UTRA); Physical layer procedures (Release 12) 225 pages.

3GPP TS 36.321 V12.4.0 (Dec. 2014) Technical Specification 3rd Generation Partnership Project; Technical Specification Group Radio Access Network; Evolved Universal Terrestrial Radio Access (E-UTRA); Medium Access Control (MAC) protocol specification (Release 12) 60 pages.

3GPP TS 36.331 V12.4.0 (Dec. 2014) Technical Specification 3rd Generation Partnership Project; Technical Specification Group Radio Access Network; Evolved Universal Terrestrial Radio Access (E-UTRA); Radio Resource Control (RRC); Protocol specification (Release 12) 410 pages.

3GPP TR 22.891 V1.2.0 (Nov. 2015) Technical Report 3rd Generation Partnership Project; Technical Specification Group Services and System Aspects; Feasibility Study on New Services and Markets Technology Enablers; Stage 1 (Release 14)—96 Pages.

Samsung, "Discussion on aperiodic CSI-RS resource configuration", 3GPP TSG RAN WG1 Meeting #83, Nov. 15-22, 2015, 3 pages, R1-156784.

Supplementary European Search Report dated Jan. 25, 2019 in connection with European Patent Application No. 17 75 6813, 9 pages.

* cited by examiner

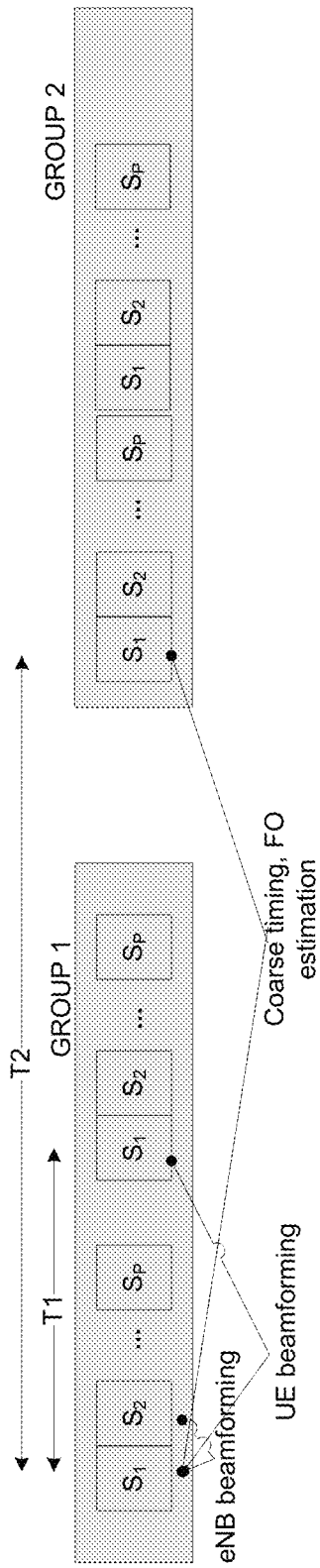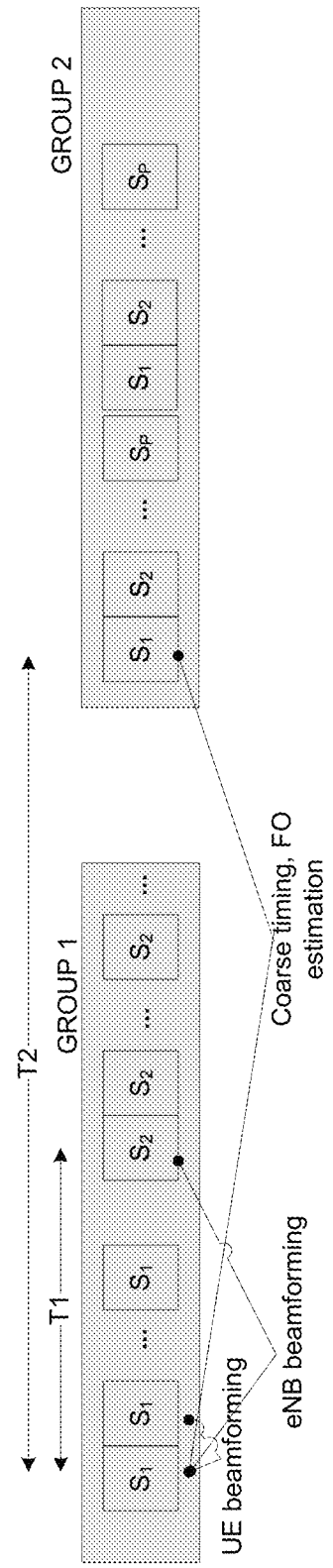

METHOD AND APPARATUS FOR MEASUREMENT REFERENCE SIGNAL

CROSS-REFERENCE TO RELATED APPLICATIONS AND CLAIM OF PRIORITY

This application claims priority under 35 U.S.C. § 119(e) to:
U.S. Provisional Patent Application Ser. No. 62/298,643 filed Feb. 23, 2016;
U.S. Provisional Patent Application Ser. No. 62/303,779 filed Mar. 4, 2016;
U.S. Provisional Patent Application Ser. No. 62/358,225 filed Jul. 5, 2016;
U.S. Provisional Patent Application Ser. No. 62/349,361 filed Jun. 13, 2016;
U.S. Provisional Patent Application Ser. No. 62/417,616 filed Nov. 4, 2016; and
U.S. Provisional Patent Application Ser. No. 62/445,993 filed Jan. 13, 2017.
The above-identified provisional patent applications are hereby incorporated by reference in their entirety.

TECHNICAL FIELD

The present disclosure relates generally to transmission of measurement reference signals. Such reference signals can be used for measuring channel state information (CSI) or other channel-quality-related quantities such as reference signal received power (RSRP).

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

SUMMARY

Various embodiments of the present disclosure provide methods and apparatuses for CSI reporting.

In one embodiment, a user equipment (UE) is provided. The UE includes a transceiver and a processor operably connected to the transceiver. The transceiver is configured to receive reference signal (RS) resource configuration information and at least two RSs. The processor is configured to measure at least one of the at least two RSs. A first RS of the at least two RSs is non-UE-specifically configured and a second RS of the at least two RSs is UE-specifically configured.

In another embodiment, a base station (BS) is provided. The BS includes a processor and a transceiver operably connected to the processor. The transceiver is configured to generate RS resource configuration information for a UE and at least two RSs for the UE. The transceiver is configured to transmit, to the UE, the RS resource configuration information and the at least two RSs. A first RS of the at least two RSs is non-UE-specifically configured and a second RS of the at least two RSs is UE-specifically configured.

In another embodiment, a method for operating a UE is provided. The method includes receiving, by the UE, RS resource configuration information and at least two RSs and measuring at least one of the at least two RSs. A first RS of the at least two RSs is non-UE-specifically configured and a second RS of the at least two RSs is UE-specifically configured.

The present disclosure relates to a pre-5th-Generation (5G) or 5G communication system to be provided for supporting higher data rates Beyond 4th-Generation (4G) communication system such as Long Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 20A illustrates an example where PSS transmission is repeated according to embodiments of this disclosure;

FIG. 20B illustrates another example where PSS transmission is repeated according to embodiments of this disclosure;

DETAILED DESCRIPTION

Figure 1:
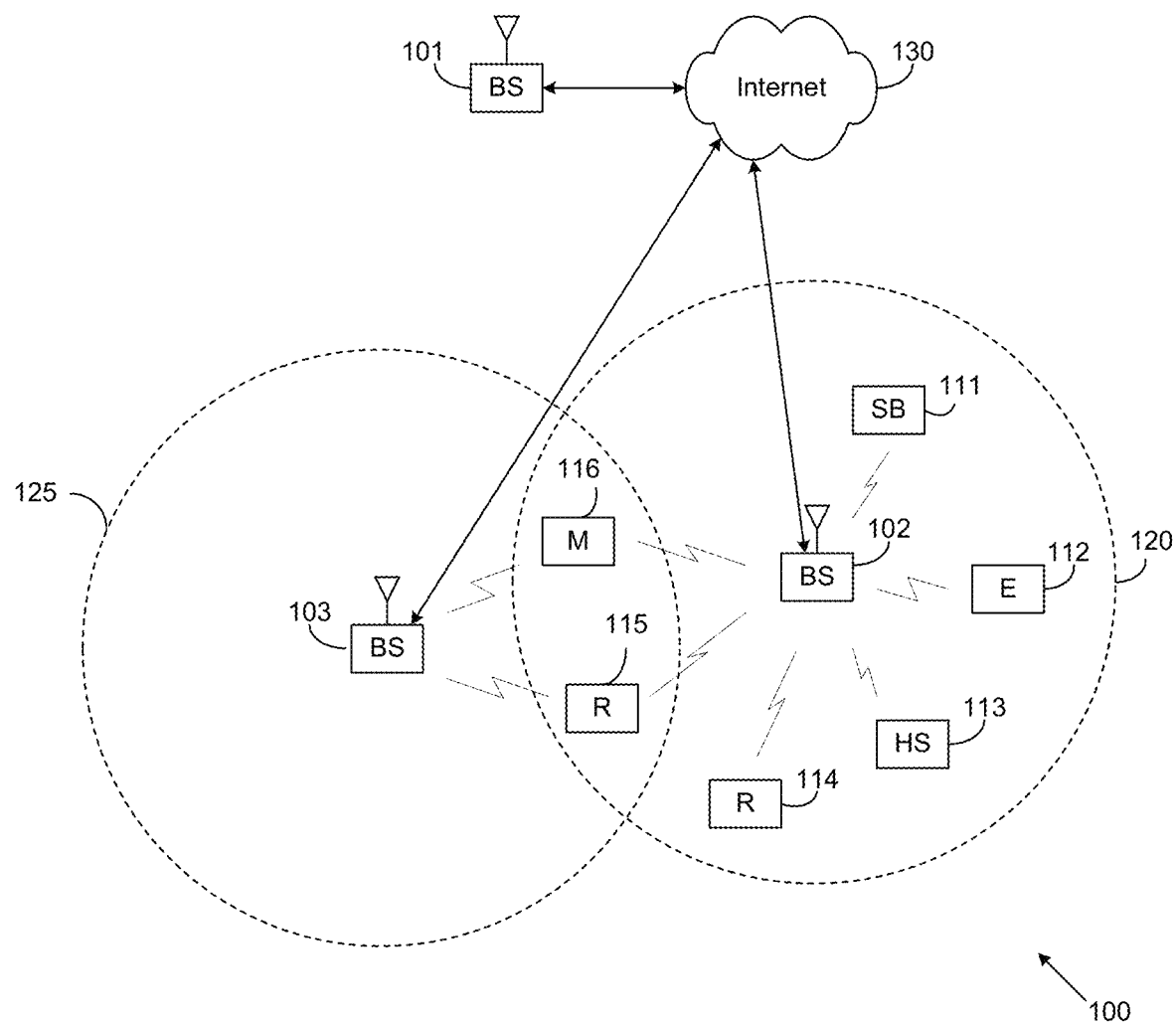
FIG. 1 illustrates an example wireless network according to various embodiments of the present disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

LIST OF ACRONYMS

2D: two-dimensional
MIMO: multiple-input multiple-output
SU-MIMO: single-user MIMO
MU-MIMO: multi-user MIMO
3GPP: 3rd generation partnership project
LTE: long-term evolution UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); and 3GPP TS 36.331 version 12.4.0, "E-UTRA, Radio Resource Control (RRC) Protocol Specification" ("REF 5").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network. Instead of "eNB", an alternative term "gNB" (general Node B) can also be used. Depending on the network type, other well-known terms can be used instead of "eNB" or "BS," such as "base station" or "access point." For the sake of convenience, the terms "eNB" and "BS" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, can have other shapes, including irregular shapes, depending upon the configuration of the eNBs and variations in the radio environment associated with natural and man-made obstructions.

As described in more detail below, one or more of eNB 101, eNB 102, and eNB 103 transmit measurement reference signals to UEs 111-116 and configure UEs 111-116 for CSI reporting as described in embodiments of the present disclosure. In various embodiments, one or more of UEs 111-116 receive and measure at least one transmission of measurement reference signals.

Although FIG. 1 illustrates one example of a wireless network 100, various changes can be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
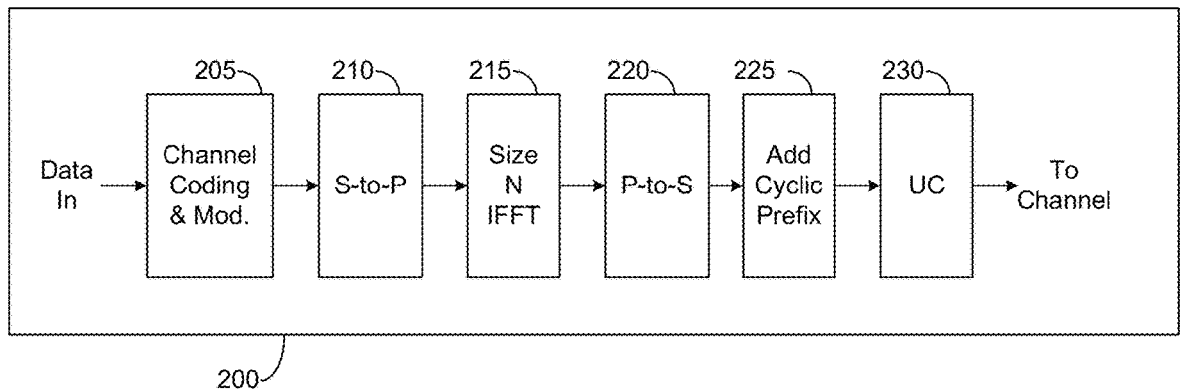
FIGS. 2A and 2B illustrate example wireless transmit and receive paths according to various embodiments of the present disclosure.
Figure 2B:
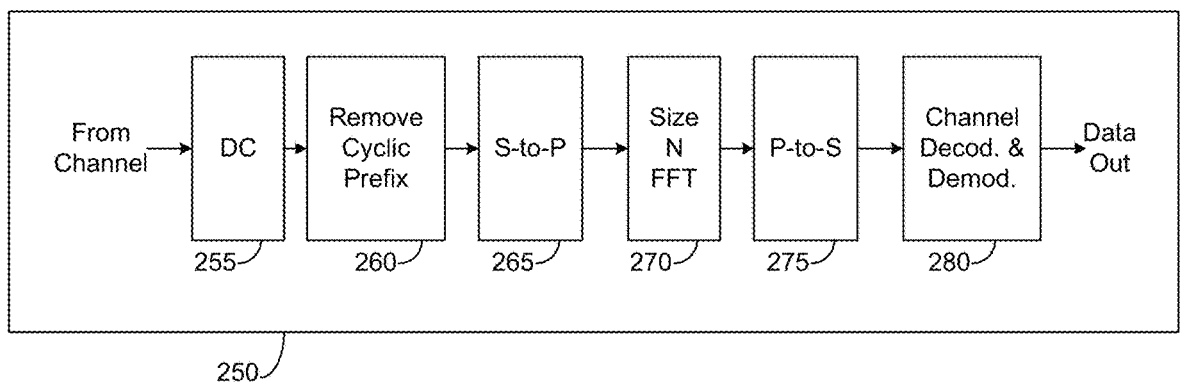

FIGS. 2A and 2B illustrate example wireless transmit and receive paths according to the present disclosure. In the following description, a transmit path 200 can be described as being implemented in an eNB (such as eNB 102), while a receive path 250 can be described as being implemented in a UE (such as UE 116). However, it will be understood that the receive path 250 could be implemented in an eNB and that the transmit path 200 could be implemented in a UE. In some embodiments, the receive path 250 is configured to receive and measure at least one measurement reference signal as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The up-converter 230 modulates (such as up-converts) the output of the 'add cyclic prefix' block 225 to an RF frequency for transmission via a wireless channel. The signal can also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for CSI reporting. Each of the eNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to eNBs 101-103 and can implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
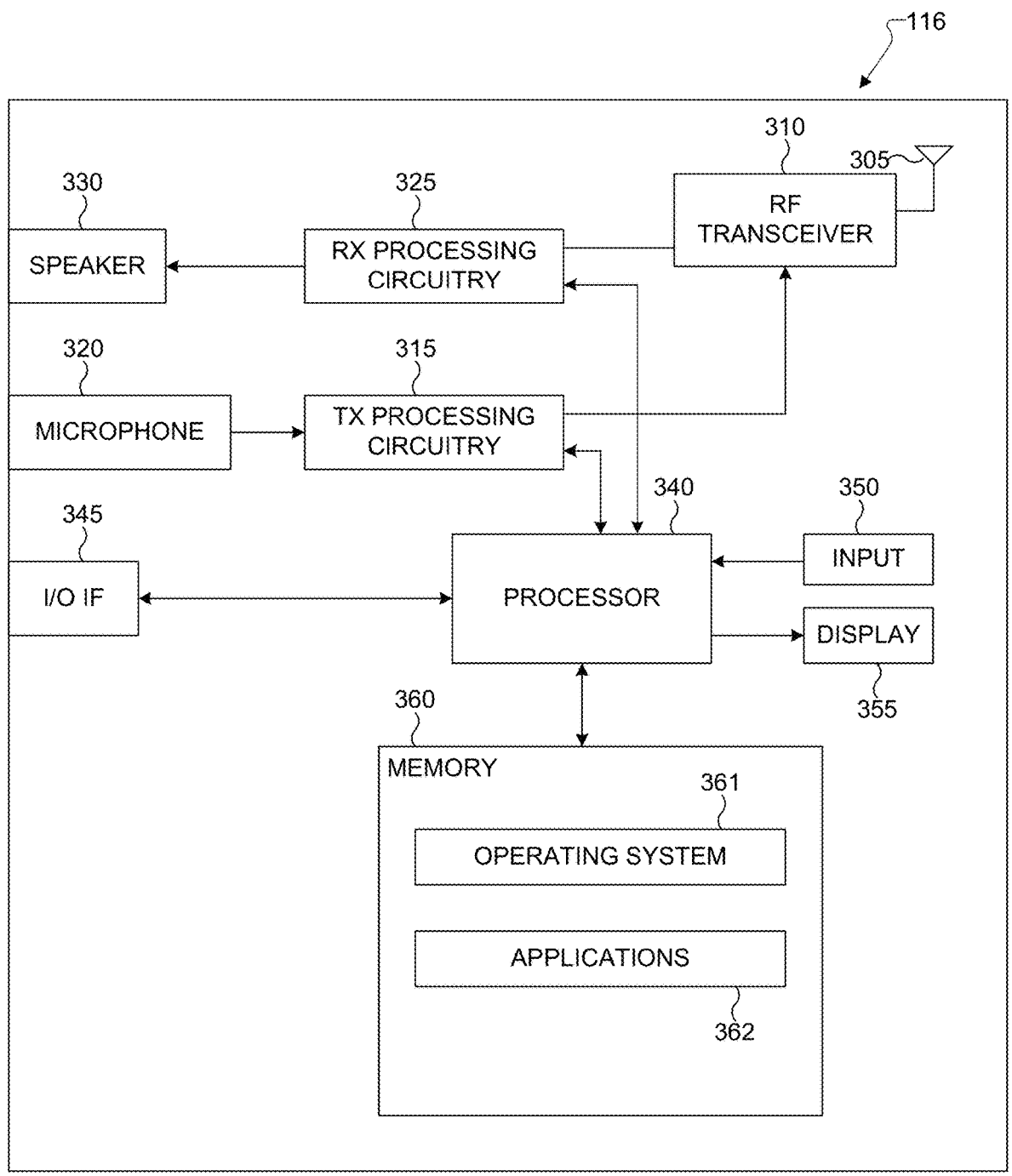
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface (IF) 345, an input 350, a display 355, and a memory 360. The memory 360 includes an operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for CQI measurement and reporting for systems described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from eNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 can perform signaling and calculation for CSI measurement and reporting. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
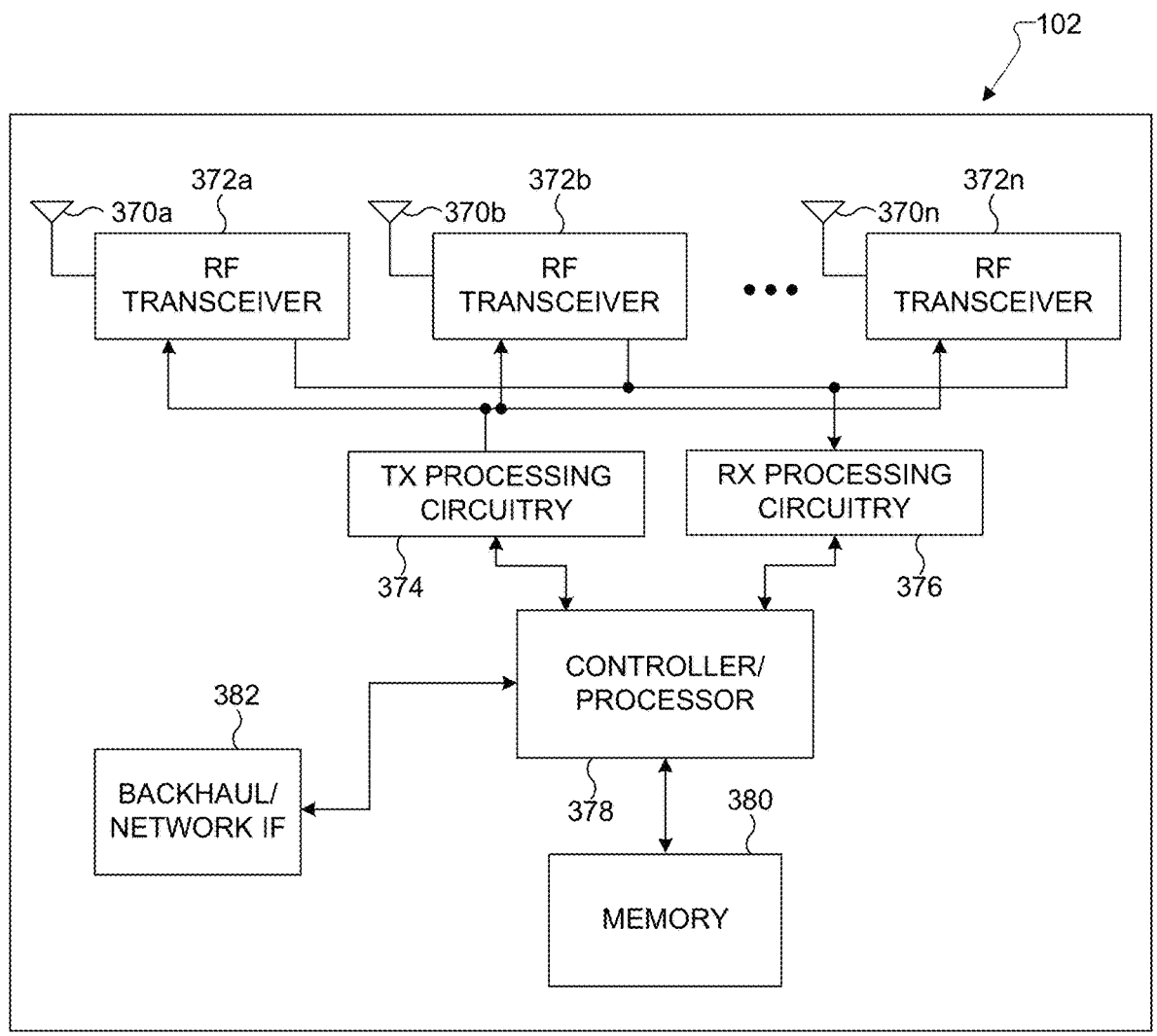
FIG. 3B illustrates an example enhanced NodeB (eNB) according to various embodiments of the present disclosure.

FIG. 3B illustrates an example eNB 102 according to the present disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of the present disclosure to any particular implementation of an eNB. eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as an OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G or new radio access technology or NR, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) perform configuration and signaling for CSI reporting.

Although FIG. 3B illustrates one example of an eNB 102, various changes can be made to FIG. 3B. For example, the eNB 102 could include any number of each component shown in FIG. 3A. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Rel.13 LTE supports up to 16 CSI-RS antenna ports which enable an eNB to be equipped with a large number of antenna elements (such as 64 or 128). In this case, a plurality of antenna elements is mapped onto one CSI-RS port. Furthermore, up to 32 CSI-RS ports will be supported in Rel.14 LTE. For next generation cellular systems such as 5G, it is expected that the maximum number of CSI-RS ports remain more or less the same.

Figure 4:
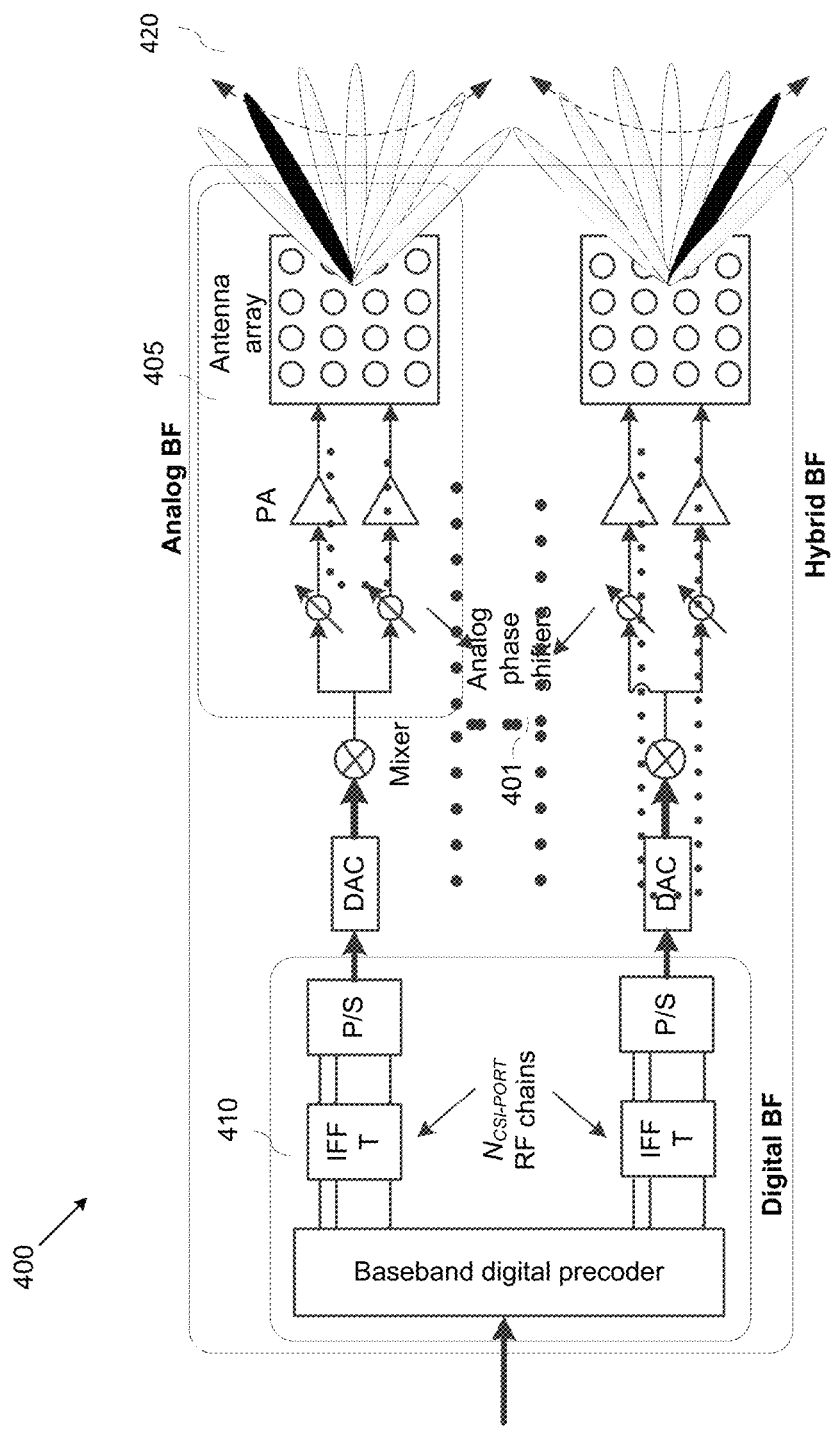
FIG. 4 illustrates an example beamforming architecture wherein one CSI-RS port is mapped onto a large number of analog-controlled antenna elements according to embodiments of this disclosure.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in transmitter 400 illustrated of FIG. 4. In this case, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles (420) by varying the phase shifter bank across symbols or subframes. The number of sub-arrays (equal to the number of RF chains) is the same as the number of CSI-RS ports $N_{CSI-PORT}$. A digital beamforming unit 410 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanism corresponding to three types of CSI-RS measurement behavior are supported in Rel.13 LTE: 1) 'CLASS A' CSI reporting which corresponds to non-precoded CSI-RS, 2) 'CLASS B' reporting with K=1 CSI-RS resource which corresponds to UE-specific beamformed CSI-RS, 3) 'CLASS B' reporting with K>1 CSI-RS resources which corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (consisting of multiple ports). Here, (at least at a given time/frequency) CSI-RS ports have narrow beam widths and hence not cell wide coverage, and (at least from the eNB perspective) at least some CSI-RS port-resource combinations have different beam directions.

In scenarios where DL long-term channel statistics can be measured through UL signals at a serving eNB, UE-specific BF CSI-RS can be readily used. This is typically feasible when UL-DL duplex distance is sufficiently small. When this condition does not hold, however, some UE feedback is necessary for the eNB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

As discussed above, utilizing UE-specific BF CSI-RS reduces the number of ports configured to each UE by applying beamforming on NP CSI-RS. For instance, a serving eNB can apply wideband beamforming on a 16-port NP CSI-RS to form a 2-port BF CSI-RS for a served UE. If each UE is configured with 2-port BF CSI-RS, the resulting total CSI-RS overhead is reduced when the number of co-scheduled UEs is less than 8—assuming the same transmission rate for NP and BF CSI-RS. However, although not all the served UEs require data transmission in every subframe, the number of served UEs per cell tends to be much larger than 8. Due to the burstiness and stochasticity of data traffic, UE-specific BF CSI-RS requires an efficient CSI-RS resource allocation mechanism to ensure that the total CSI-RS overhead can be minimized or, conversely, the number of served UEs per cell can be maximized.

For next generation cellular systems (especially enhanced mobile broadband, or often termed eMBB, scenarios), efficient CSI-RS resource allocation mechanism and CSI measurements become more critical as the number of UEs serviced per cell will increase along with their throughput requirements. While the three-type CSI-RS design in Rel.13 LTE can cater for different scenarios, redundancies exist especially between NP CSI-RS (with partial port mapping) and cell-specific BF CSI-RS. Furthermore, CSI-RS resource utilization is based on periodic transmission and measurement. That is, CSI-RS is transmitted and measured periodically even when it is not needed. This results in some unnecessary throughput loss and increase in interference (inter and intra-cell). In addition, backward compatibility constraints (such as the presence or non-presence of CRS) tend to restrict the potential of CSI-RS.

Therefore, there is a need for a CSI-RS design which enables efficient resource allocation mechanism for next generation cellular systems and is free of the aforementioned constraints.

The present disclosure includes at least three components for CSI-RS design. A first component is a multi-level hierarchical CSI-RS design (with a special case of two-level CSI-RS): coverage CSI-RS and UE-specific CSI-RS, or multi-level CSI-RS. A second component is transmission procedure of the two types of CSI-RS. A third component is CSI measurement procedure associated with the design along with its DL and UL signaling supports.

For the first component (that is, multi-level hierarchical CSI-RS), one embodiment can be described as follows. In one embodiment, two types or levels of CSI-RS are utilized: coverage CSI-RS (type 1) and UE-specific CSI-RS (type 2). In terms of design, they can be differentiated based on their coverage areas, the number of ports, resource pools, resolutions, or the physical channels the CSI-RS types are associated with. The names 'coverage CSI-RS' and 'UE-specific CSI-RS' are exemplary and can be substituted with other names or labels without changing the substance of this embodiment.

A coverage CSI-RS can be transmitted to provide coverage for a wider area within a cell. This wide area can constitute a virtual sector where all the K virtual sectors share the same cell identification (cell ID). Each virtual sector k corresponds to one coverage CSI-RS hence one CSI-RS resource of $N_k$ CSI-RS ports. At least one of the K CSI-RS resources can be precoded (beamformed) to ensure that the coverage CSI-RS can attain the desired coverage. Therefore, a coverage CSI-RS is transmitted by an eNB along a directional beam whose width and depth (penetration/reach) reach a targeted group of UEs. A special case of K=1 corresponds to one virtual sector per cell. In this case, one common coverage CSI-RS is used for one entire cell. Since there is no sectorization, coverage CSI-RS can be transmitted with an omnidirectional beam pattern.

Associating a coverage CSI-RS with a virtual sector can be relevant especially for sub-6-GHz frequency bands. Another possibility (especially applicable for mmWave frequency bands) is to associate a coverage CSI-RS with coarse spatial granularity. In this sub-embodiment, a set of K coverage CSI-RS resources—and their corresponding beams—facilitates coarse spatial synchronization which is analogous to coarse timing and frequency synchronization via synchronization signals (primary synchronization signal PSS and/or secondary synchronization signal SSS).

An exemplary embodiment implements this scheme by allowing simultaneous transmission of K coverage beams (associated with K coverage CSI-RS resources) either in time-domain or frequency domain or both time-frequency domain. This sub-embodiment can be used in either sub-6-GHz or mmWave bands although it is more relevant in sub-6-GHz where transmitting multiple beams simultaneously results in low penetration (as the total eNB transmit power can be distributed across K beams while still meeting the link budget).

Figure 7:
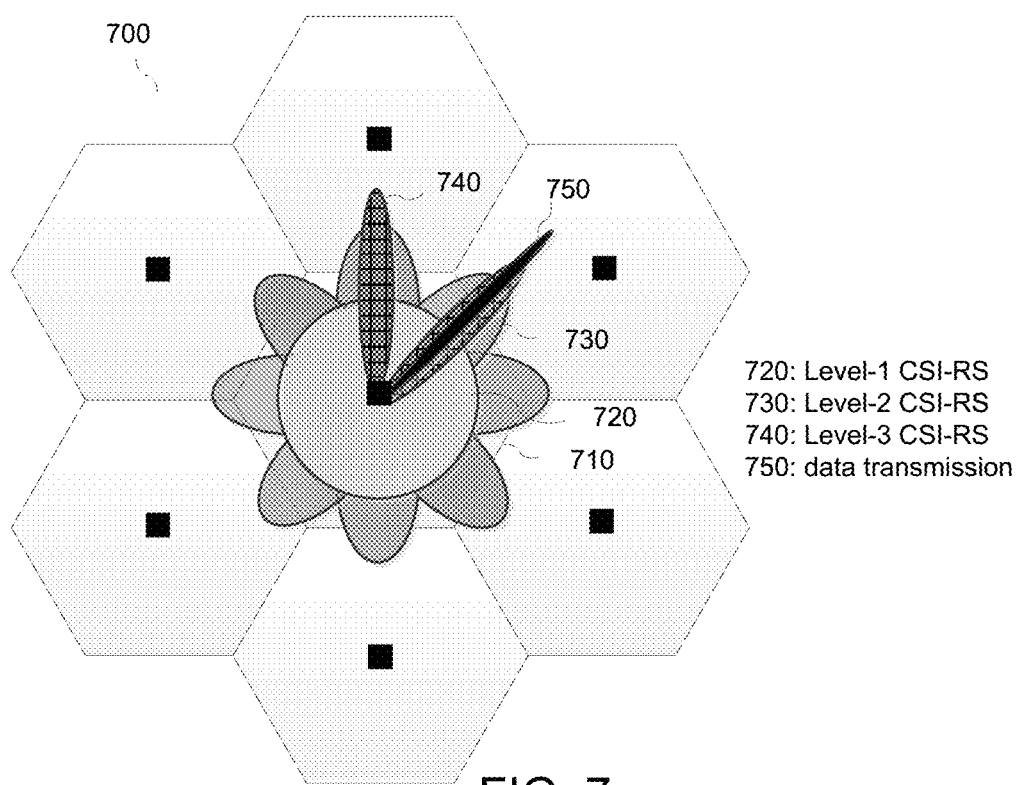
FIG. 7 illustrates an example three-level CSI-RS design according to embodiments of this disclosure.

Another exemplary sub-embodiment implements this scheme by sweeping across K coverage beams (associated with K coverage CSI-RS resources) in time-domain. That is, at a given time unit (such as symbol or subframe n), a coverage CSI-RS (associated with one CSI-RS resource) is transmitted on one of the K beams (such as beam mod(n, K)). This is illustrated in FIG. 7 where each sub-array generates an analog beam which forms a sweeping coverage beam across time units. In this example, K=6. The directions of these beams, associated with K beamforming vectors, are either static or semi-static. This sub-embodiment can be used in either sub-6-GHz or mmWave bands although it is more relevant in mmWave where transmitting multiple beams simultaneously results in low penetration (as the total eNB transmit power is distributed across K beams and hence K coverage CSI-RSs and propagation loss is higher).

Another exemplary sub-embodiment implements this scheme by allowing simultaneous transmission of K coverage beams (associated with K coverage CSI-RS resources) in time-domain but multiplexing K coverage beams (associated with K coverage CSI-RS resources) in frequency-domain. That is, in a given frequency unit (such as PRB or a collection of PRBs), coverage CSI-RS is transmitted on one of the K beams (such as beam mod(n, K)). This is illustrated in FIG. 4 where each sub-array generates an analog beam which forms a sweeping coverage beam across frequency units. In this example, K=6. The directions of these beams, associated with K beamforming vectors, are either static or semi-static. This sub-embodiment can be used in either sub-6-GHz or mmWave bands where frequency-selective (subband) beamforming is feasible.

A UE-specific CSI-RS can be transmitted to facilitate more accurate and focused DL channel measurement. While a coverage CSI-RS facilitates DL channel measurement over a wider area or range of directions and is intended to be measured by a group of UEs, UE-specific CSI-RS facilitates DL channel measurement over a narrower area or range of directions and is intended to be measured by a particular UE (or at most a small number of co-located UEs).

At least two sub-embodiments of UE-specific CSI-RS can be devised. A first sub-embodiment utilizes UE-specific beamforming derived from an acquired CSI at the eNB on CSI-RS ports. The beamforming operation is derived independently from coverage CSI-RS. A second sub-embodiment utilizes UE-specific beamforming which is calculated relative to the beamforming applied on coverage CSI-RS. Therefore, the resultant beamforming operation applied on UE-specific CSI-RS includes the beamforming applied on coverage CSI-RS (as a first stage) as well as the additional UE-specific beamforming (as a second stage). The resultant UE-specific beam corresponds to a subspace of the coverage beam.

Just as coverage CSI-RS, UE-specific CSI-RS can include L≥1 UE-specific beams (associated with L UE-specific CSI-RS resources). Each of these L UE-specific CSI-RS resources can comprise one or multiple antenna ports and be utilized to form a higher-resolution beam. For instance, a UE configured with an L-resource/beam UE-specific CSI-RS can measure L higher-resolution CSI-RS beams and select a subset of L beams, along with their CSIs or RSRPs, for the purpose of CSI acquisition.

Figure 5:
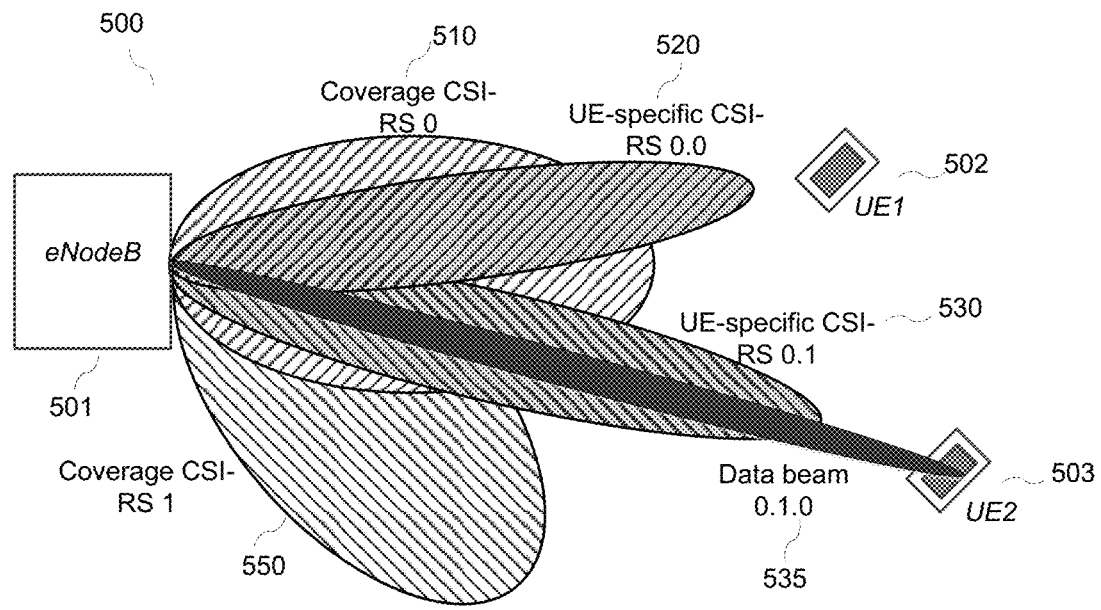
FIG. 5 illustrates an example two-level CSI-RS design which includes two coverage CSI-RS settings and two UE-specific CSI-RS settings within the first coverage CSI-RS according to embodiments of this disclosure.

FIG. 5 illustrates the above two-level CSI-RS design 500 according to embodiments of this disclosure. An eNB 501 transmits two coverage CSI-RSs 510 and 550 on two coverage beams to two UEs 502 and 503. These two coverage beams 0 and 1 (hence two coverage CSI-RSs) can be transmitted simultaneously or multiplexed in time or frequency. Using the second sub-embodiment of UE-specific CSI-RS, the eNB transmits two UE-specific CSI-RSs 0.0 (520) and 0.1 (530). The two UE-specific beams utilized for transmitting the two UE-specific CSI-RSs are derived relative to the first coverage beam and hence correspond to subspaces of the coverage beam. Since these two UE-specific beams are transmitted along a smaller range of directions, they have higher penetration due to additional beamforming gains. The second UE 503 measures UE-specific CSI-RS 530 and receives data transmission from the eNB along a data beam 0.1.0 (535). Beamforming vector for the data beam can be formed either from a CSI reporting derived from the UE-specific CSI-RS 530 (relevant for FDD) or measuring UL SRS (relevant for TDD).

Figure 6:
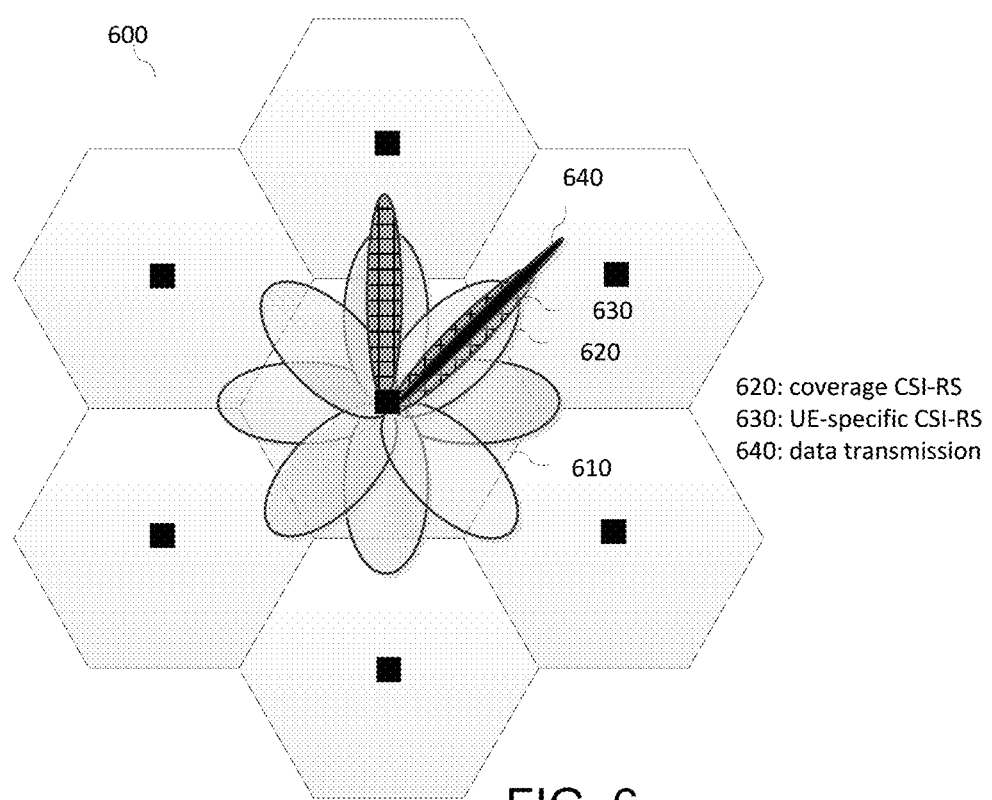
FIG. 6 illustrates an example two-level CSI-RS design which includes six coverage CSI-RS settings and a UE-specific CSI-RS setting within the first coverage CSI-RS according to embodiments of this disclosure.

FIG. 6 illustrates an exemplary use case of the two-level CSI-RS design in a cellular deployment 600 according to embodiments of this disclosure. Only one cell 610 is shown in this description. Eight coverage CSI-RSs along with their beams (620) and two UE-specific CSI-RSs associated with two different coverage CSI-RSs (630) are utilized. One data transmission along a beam 640 is shown. Compared to UE-specific CSI-RS, coverage CSI-RS is measured by a larger number of UEs. For instance, UE-specific CSI-RS can be configured for (and hence measured by) only one UE. Coverage CSI-RS, on the other hand, can be configured for (and hence measured by) all the UEs within one sector or sub-cell.

While FIG. 6 employs two-level CSI-RS design, FIG. 7 illustrates an exemplary embodiment with a three-level CSI-RS design in a cellular deployment 700 according to embodiments of this disclosure. Only one cell 710 is shown in this description. A first-level CSI-RS 720 is transmitted along an omni-directional beam (hence wide coverage) yet weaker penetration (reach). There is only one level-one CSI-RS. A third-level CSI-RS 740 is transmitted along a beam with narrow coverage yet stronger penetration (reach). A level-two CSI-RS 730 uses a beam with wider coverage than level-three and weaker penetration (reach) than level-two. There are eight level-two CSI-RSs shown in FIG. 7. One data transmission along a beam 750 is shown. In general, compared to level-n CSI-RS, level-(n−1) CSI-RS is measured by a larger number of UEs (n=2, 3, . . . , K).

Any of the M CSI-RS types/levels (type/level m) can include $L_m \geq 1$ beams (associated with L UE-specific CSI-RS resources). Each of these L CSI-RS resources can comprise one or multiple antenna ports. For instance, a UE configured with an $L_m$-resource/beam CSI-RS can measure $L_m$ higher-resolution CSI-RS beams and select a subset of $L_m$ beams, along with their CSIs or RSRPs, for the purpose of CSI acquisition.

In one embodiment for resource allocation, the aforementioned levels or types of CSI-RS can be derived from a common pool of CSI-RS resources. In another embodiment, each type of CSI-RS can be derived from a distinct pool of CSI-RS resources. The first embodiment allows more efficient resource utilization.

When an eNB configures a UE with a plurality of CSI-RS types, the eNB can differentiate between these CSI-RS types in several manners. A first possibility is to configure a UE with M CSI-RS resources and each of the M CSI-RS resources is associated (or carries) a configuration parameter indicating the CSI-RS type or level. This CSI-RS type will dictate UE CSI measurement behavior. A second possibility is to configure a UE with M CSI-RS resources without any parameter indicating the CSI-RS type or level. The coverage and penetration of each of the M CSI-RS resources are transparent to the UE. Either way, this CSI-RS configuration information (for each of the M CSI-RS resources) can be signaled to the UE either semi-statically via higher-layer (RRC) signaling or dynamically via MAC control element (MAC CE) or L1 control channel(s). Moreover, these M CSI-RS resources can be associated with one CSI process or K CSI processes (where one CSI-RS resource corresponds to one CSI process).

Similar to coverage CSI-RS, an exemplary embodiment implements this scheme by allowing simultaneous transmission of M CSI-RS resources (associated with M beams) either in time-domain (time subsampling), or frequency domain (frequency subsampling), or neither time nor frequency (time-frequency subsampling), or both time-frequency domain. The first three options allow an eNB to map (hence a UE to measure) only a subset of CSI-RS ports for a given time and/or frequency resource unit (such as subframe/slot and frequency resource block). This can be termed partial-port mapping. The last option allows an eNB to map (hence a UE to measure) all the CSI-RS ports for a given time and/or frequency unit (such as subframe/slot and frequency resource block). This can be termed full-port mapping.

For the second component (that is, CSI-RS transmission procedure and configuration), one embodiment can be described as follows. In one configuration embodiment, all the CSI-RS levels can be configured via higher-layer (RRC) signaling, MAC control element (MAC CE), and/or DL L1 control signaling (based on DCI). In this case, such configuration is UE-specific.

To configure a UE with M CSI-RS resources, CSI-RS resource configuration which carries a set of UE-specific parameters can be used. This configuration can be transmitted to the UE via either higher-layer (RRC) signaling, MAC control element (MAC CE), and/or DL L1 control signaling (based on DCI).

Figure 8:
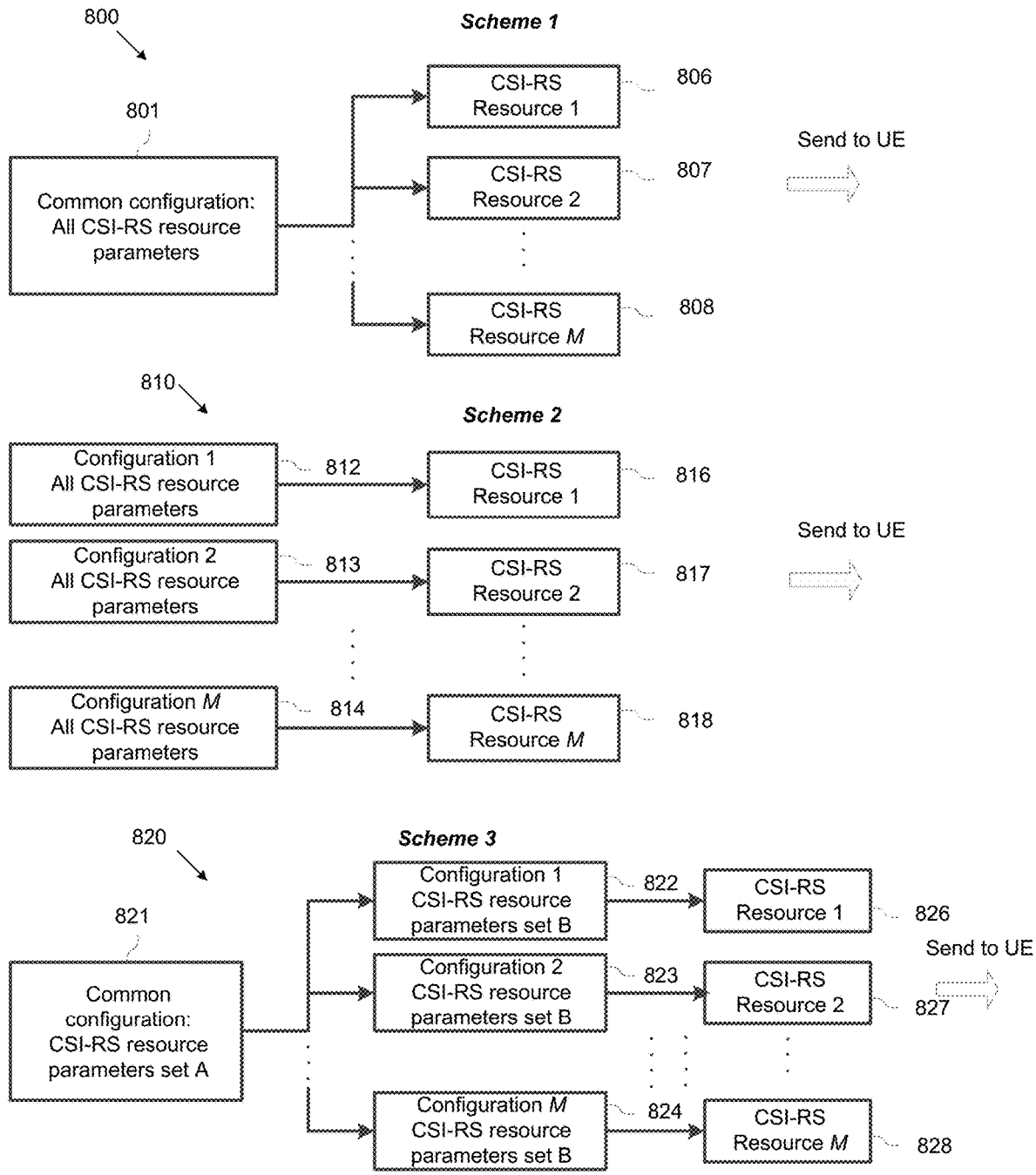
FIG. 8 illustrates three examples of CSI-RS configurations for two-level CSI-RS according to embodiments of this disclosure.

When a UE is configured with M CSI-RS resources, at least three schemes exist. These three possibilities are illustrated in FIG. 8. A first scheme 800 is to use a common resource configuration which applies to all the M resources (801 in scheme 800 of FIG. 8). Such a common configuration includes all applicable CSI-RS resource parameters. This allows an eNB to configure a UE with M identical CSI-RS resources (806, 807, and 808 in scheme 800 of FIG. 8). Although this common configuration can be signaled via higher-layer (RRC) signaling, MAC control element (MAC CE), and/or DL L1 control signaling (based on DCI), signaling via higher-layer (RRC) signaling seems to be a first choice. This scheme, however, can be too restrictive for multi-level CSI-RS.

A second scheme 810 is to use M independent/separate resource configurations (812, 813, and 814 in scheme 810 of FIG. 8). Each of the M CSI-RS resource-specific configurations includes all applicable CSI-RS resource parameters. This allows full flexibility for multi-level CSI-RS since each of the M resources can be configured independently (816, 817, and 818 in scheme 810 of FIG. 8). Each of the M separate configurations can be signaled via higher-layer (RRC) signaling, MAC control element (MAC CE), and/or DL L1 control signaling (based on DCI).

A third scheme 820 is to use one CSI-RS resource configuration which contains only a set of parameters common to all the M CSI-RS resources (821 in scheme 820 of FIG. 8) and M sub-configurations (822, 823, and 824 in scheme 820 of FIG. 8), each of which containing a different set of parameters specific to each of the M CSI-RS resources (826, 827, and 828 in scheme 820 of FIG. 8). The first and second sets of parameters are termed set A and B, respectively, where A∪B contains all CSI-RS resource configuration parameters while A∩B=∅ (no overlapping) or overlapping. In principle, scheme 2 is suitable when M CSI-RS resources correspond to M CSI-RS with different resolutions in space, time, and/or frequency dimensions. On the other hand, scheme 3 is suitable when M CSI-RS resources correspond to M CSI-RS with a same resolution (in space, time, and/or frequency dimensions) but are pointed at different beam directions. An example configuration signaling for this third scheme is to signal the common configuration via higher-layer (RRC) signaling, and each of the M separate configurations via either higher-layer (RRC) signaling, MAC control element (MAC CE), and/or DL L1 control signaling (based on DCI). That is, the signaling of a separate configuration can be semi-static (via RRC signaling) or dynamic (via MAC CE or L1 DL control signaling).

In another configuration embodiment, all the CSI-RS levels can be configured via common control signaling (such as broadcast channels), higher-layer (RRC) signaling, MAC control element (MAC CE), and/or DL L1 control signaling (based on DCI). In this case, such configuration is UE-specific. The use of common control signaling is suitable for level I and/or coverage CSI-RS which are cell-/TRP (transmit-receive-point)-/gNB-/eNB-/UE-group-specific (or, in general, non-UE-specific) rather than UE-specific. Common control signaling can comprise including the pertinent configuration information in the Master Information Block (MIB) which is received by a UE via Primary Broadcast Channel (P-BCH). Alternatively, it can comprise including the pertinent configuration information in one of the System Information Blocks (SIB-x) which is received by a UE via an L1 DL control channel (such as PDCCH).

In this case, all the three embodiments in FIG. 8 (800, 810, or 820) apply. However, the common configuration information (component 801 or 821) is signaled via common control signaling—either included in MIB (received via P-BCH) or SIB-x (received via an L1 DL control channel). Each of the M separate configurations via either higher-layer (RRC) signaling, MAC control element (MAC CE), and/or DL L1 control signaling (based on DCI).

In the present disclosure, the aforementioned CSI-RS resource configuration contains at least one of the following categories of parameters: 1) CSI-RS type or level (as previously mentioned), 2) Time-domain configuration, 3) Frequency-domain configuration, 4) CSI-RS port subset configuration.

As previously mentioned, CSI-RS type or level corresponds to a level of penetration and coverage of a CSI-RS resource. This level can be either absolute or relative. An absolute level can be a value which represents a power measure such as EPRE (energy-per-resource element) either in dB (relative to a fixed reference) or dBm. This can be defined relative to data transmission power or relative to a cell-specific RS. For the second option, level-one (for instance, coverage) CSI-RS, if configured as a cell-specific RS, can be used as a reference for both data and level-n CSI-RS where n>1 (for instance, UE-specific CSI-RS). A relative level can reflect difference in coverage and/or penetration across the M configured CSI-RS resources. For example, analogous to FIG. 7, M=4 with the first, second, third, and fourth CSI-RS level as 1, 2, 2, and 3, respectively, indicates that the second and third CSI-RS resources are of a same level of coverage and penetration, but of a higher penetration (hence lower coverage) than the first CSI-RS resource, and of a lower penetration (hence higher coverage) than the fourth CSI-RS resource.

The content of time-domain configuration can include periodicity and time unit (for instance, one slot or one subframe) offset when periodic CSI-RS transmission from an eNB and/or periodic CSI-RS measurement at a UE are assumed. However, if a UE shall assume that either CSI-RS is transmitted aperiodically or CSI-RS is measured aperiodically, periodicity and time unit offset are not needed. Instead, time-domain configuration includes a trigger or a flag signaled via a DL L1 control channel.

Figure 9:
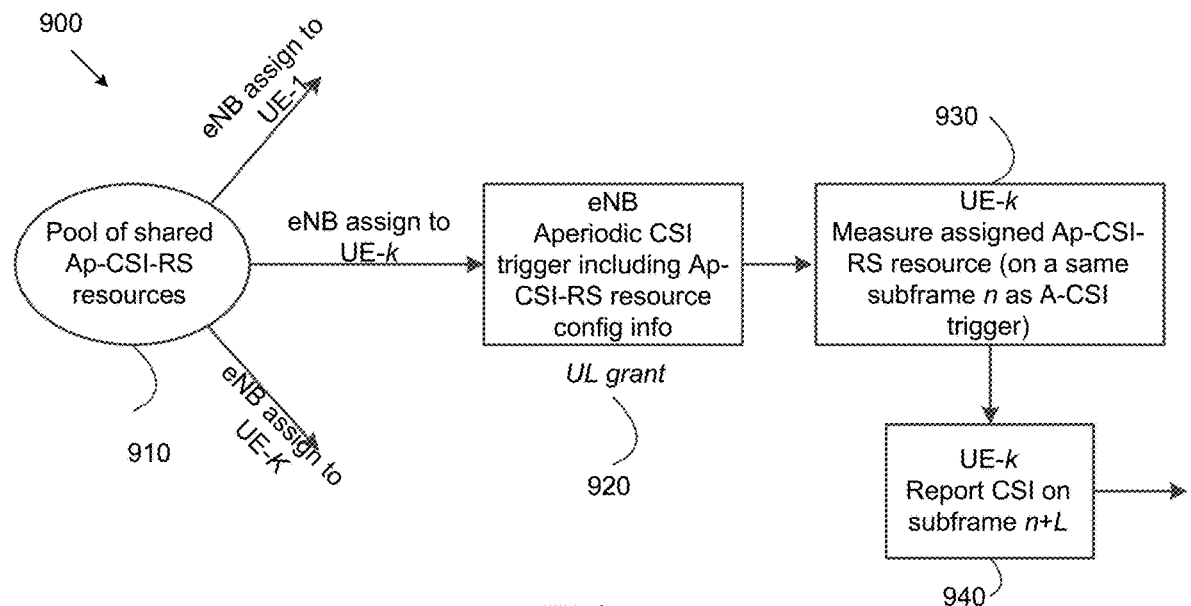
FIG. 9 illustrates an example of aperiodic CSI-RS which includes eNB and UE operations according to embodiments of this disclosure.
Figure 10:
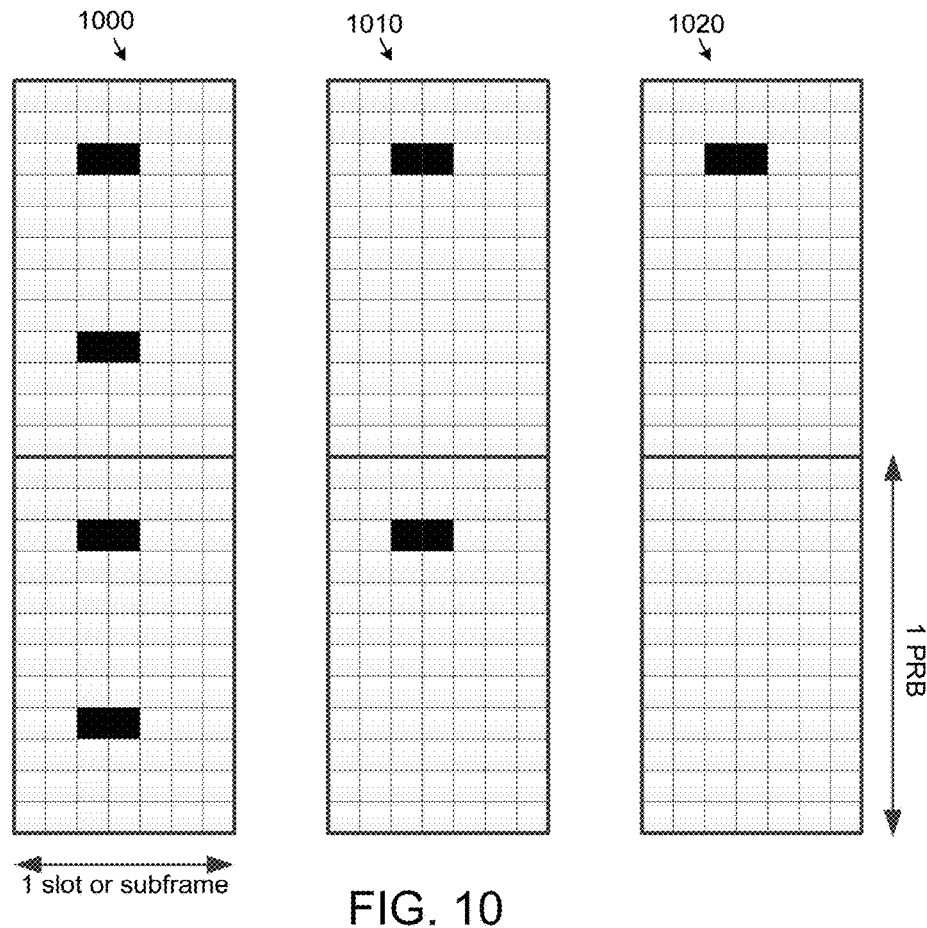
FIG. 10 illustrates three examples of CSI-RS time-frequency patterns wherein a pattern used for lower frequency resolution can be chosen as a subset of that for CSI-RS with higher frequency resolution according to embodiments of this disclosure.

An embodiment of aperiodic CSI-RS, which includes eNB and UE operations, is illustrated in flow diagram 900 of FIG. 9. Aperiodic CSI-RS (Ap-CSI-RS) is characterized by two primary features. First, a pool of CSI-RS resources is defined and shared among multiple served UEs (910). A CSI-RS resource from this pool is assigned to a UE only when the UE measures CSI through CSI-RS (hence a resource is used only when it is needed). The UE needs to measure CSI when its associated serving eNB chooses to receive a CSI reporting calculated based on a most recent channel.

This leads to a second primary feature. Ap-CSI-RS assignment is done in conjunction with an aperiodic CSI request from the serving eNB to a served UE (in this example, termed UE-k). Therefore, Ap-CSI-RS resource information is included in a DCI of an UL grant which contains an aperiodic CSI (A-CSI) request to UE-k in subframe n (920). Along with it is the Ap-CSI-RS itself, which is placed in the same DL subframe n as the A-CSI trigger and the Ap-CSI-RS resource information. In another example, the Ap-CSI-RS can be placed in another subframe following subframe n (at the expense of CSI reporting delay). In response to the CSI request and the Ap-CSI-RS resource information in subframe n (assuming that the Ap-CSI-RS is placed in subframe n), UE-k measures the associated Ap-CSI-RS assigned by the eNB (930) and reports a requested A-CSI in subframe n+L (940) where L is specified and can be scenario-dependent. For instance, a default value of L is 4 following Rel.13 LTE.

The content of frequency-domain configuration can include time-frequency CSI-RS pattern within one time unit (for instance, one slot or one subframe). Time-frequency pattern within one time unit describes the locations of CSI-RS REs across sub-carriers and OFDM symbols. This holds for both periodic and aperiodic CSI-RS transmission from an eNB and/or CSI-RS measurement at a UE. Other than time-frequency pattern, a UE can also be configured with a CSI-RS resource which spans only over a portion of the system bandwidth. For instance, a CSI-RS resource to which the UE is assigned corresponds to only a set of m<M PRBs out of the entire system bandwidth which spans over M PRBs. This can be termed the CSI-RS bandwidth, which can be configured either via higher layer signaling, UL grant or DL assignment via PDCCH/EPDCCH, or MAC control element via DL-SCH.

The content of port-subset configuration can include a subset of the available antenna ports and the number of antenna ports $N_{PORT}$ configured for a UE. To define a set of CSI-RS port numbers assigned to a UE, a master set of all the available port numbers $\{Port_0, Port_0+1, \ldots, Port_0+N_{PORT,MAX}-1\}$ is needed. At least two options are available. For a given number of CSI-RS ports $N_{PORT}$, an $N_{PORT}$-port CSI-RS resource can be specified in terms of a port-subset of the master set $\{Port_0, Port_0+1, \ldots, Port_0+N_{PORT,MAX}-1\}$. At least two options are possible.

In a first option for port subset selection, an $N_{PORT}$-port CSI-RS resource is always associated with port numbers $\{Port_0, Port_0+1, \ldots, Port_0+N_{PORT}-1\}$. That is, the assigned CSI-RS port numbers are consecutive for any CSI-RS resource assignment. In this case, the set of CSI-RS port numbers is fixed for a given number of CSI-RS ports. Given the number of CSI-RS ports $N_{PORT}$, there is no need to indicate or signal port subset selection in Ap-CSI-RS resource configuration.

A second option for port subset selection which offers more flexible resource allocation and increased number of resource configurations is to allow a CSI-RS resource configuration to be associated with port numbers $\{Port(0), Port(1), \ldots, Port(N_{PORT}-1)\}$ where $Port(i)$ can be any port number taken from the master set. A constraint of $Port(i) < Port(k), i>k$ can be further imposed. For a given value of $N_{PORT,MAX}$ and $N_{PORT}$, a total of $$N_{cand} = \binom{N_{PORT,MAX}}{N_{PORT}}$$

candidates for CSI-RS port subset selection are available. Thus, if port subset selection is unrestricted, all these candidates are available. In another example, only a part of these available candidates can be used. In that case, a restricted subset of available candidates $$N_{cand} < \binom{N_{PORT,MAX}}{N_{PORT}}$$

is used. For this second port subset selection option, port subset selection is to be signaled and indicated in Ap-CSI-RS resource configuration info. For this purpose, either a length-$N_{PORT,MAX}$ bitmap (indicating which port numbers are assigned to a UE) or a $\lceil \log_2 N_{cand} \rceil$-bit port subset indicator can be used. The bitmap is applicable for either unrestricted or restricted subset selection. The subset indicator, on the other hand, is suitable for restricted subset selection.

The four categories of CSI-RS resource configuration parameters are related to CSI-RS resolution in time, frequency, and antenna port (spatial beam). Therefore, CSI-RS subsampling can be performed in at least one of these three dimensions. An exemplary embodiment is to associate higher frequency resolution with aperiodic CSI-RS transmission and measurement (only transmitted and/or measured when needed), but lower frequency resolution with periodic CSI-RS transmission and measurement. Lower frequency resolution can be attained with lower CSI-RS RE density (frequency subsampling) which can be used in conjunction with beam-level subsampling.

To ensure that CSI reports associated with CSI-RS resources of different frequency resolutions can be jointly used at an eNB, the CSI-RS time-frequency (T-F) pattern used for lower frequency resolution can be chosen as a subset of that for CSI-RS with higher frequency resolution. This can be illustrated in FIG. 10 with three CSI-RS patterns 1000, 1010, and 1020. In this example, 1000 uses 2 REs per PRB (hence of highest frequency resolution), while 1010 and 1020 use 1 RE per PRB and 0.5 RE per PRB, respectively. When 0.5 RE/PRB is used, only the PRB 1021 contains CSI-RS REs (frequency subsampling)—or a UE shall measure only PRB 1021 (every other PRBs) for computing CSI reports.

Therefore, in one embodiment, each of the M levels or types of CSI-RS is associated with a set of CSI-RS T-F patterns (as exemplified above) wherein each of the M CSI-RS T-F patterns is associated with a frequency resolution. A UE configured with an M-level/M-type CSI-RS can be configured with one of the CSI-RS T-F patterns for each level/type.

In a variation of the above embodiment, when M=2, the set of CSI-RS T-F patterns associated with the first level/type is a subset of that associated with the second level/type. In particular, if the first level/type is coverage or non-UE-specific CSI-RS which is cell-/TRP-/gNB-/eNB-/UE-group-specific (or, in general, non-UE-specific), and the second level/type is UE-specific CSI-RS, the set of CSI-RS T-F patterns associated with coverage/non-UE-specific CSI-RS is a subset of a larger set of CSI-RS T-F patterns associated with UE-specific CSI-RS. In one example, maximum frequency density associated with coverage/non-UE-specific CSI-RS is lower than that associated with UE-specific CSI-RS.

In another variation of the above embodiment, when M=2, the maximum number of ports associated with first level/type is higher than that associated with the second level/type. In particular, if the first level/type is coverage or non-UE-specific CSI-RS which is cell-/TRP-/gNB-/eNB-/UE-group-specific (or, in general, non-UE-specific), and the second level/type is UE-specific CSI-RS, the maximum number of ports associated with coverage/non-UE-specific CSI-RS is higher than that associated with UE-specific CSI-RS.

For the third component (that is, CSI measurement and reporting procedure), one embodiment can be described as follows. Each CSI-RS resource can be associated with a set of CSI reports. If an eNB configures a UE with M CSI-RS resources, M sets of CSI-RS reports are expected when the M CSI-RS resources are associated with different resolutions. On the other hand, fewer than M sets of CSI reports (or even one set) are suitable when M CSI-RS resources correspond to M CSI-RS with a same resolution (in space, time, and frequency) but are pointed at different beam directions. For the second case, a UE can also report CSI-RS resource selection.

Likewise, low frequency resolution CSI-RS transmission (or low frequency resolution CSI-RS measurement) can be associated with low-resolution CSI reporting. An exemplary embodiment of low-resolution CSI reporting is wideband CSI reporting where one CQI and PMI are reported for all the configured subbands. High frequency resolution CSI-RS transmission (or high frequency resolution CSI-RS measurement) can be associated with high-resolution CSI reporting. An exemplary embodiment of high-resolution CSI reporting is to report one CQI per subband and/or subband precoding recommendation. Instead of precoding recommendation, quantized channel coefficients can be reported.

In another embodiment, low frequency resolution CSI-RS transmission (or low frequency resolution CSI-RS measurement) can be associated with high-resolution CSI reporting. An exemplary embodiment of high-resolution CSI reporting is to report one CQI per subband and/or subband precoding recommendation. (for instance, subband selection will be done based on NP CSI-RS) High frequency resolution CSI-RS transmission (or high frequency resolution CSI-RS measurement) is associated with low-resolution CSI reporting. An exemplary embodiment of low-resolution CSI reporting is to report one CQI per subband and/or subband co-phasing recommendation. Here, the high frequency resolution CSI-RS can be transmitted in the given subband, for instance, similar to the operation of demodulation-RS.

In addition, periodic CSI-RS is associated with periodic CSI (P-CSI) reporting while aperiodic CSI-RS (Ap-CSI-RS) is associated with aperiodic CSI (A-CSI) reporting.

Periodic CSI-RS and P-CSI reporting can be configured for a UE as follows. First, an eNB configures a UE with at least one periodic CSI-RS resource and at least one P-CSI reporting (which at least includes reporting mode, periodicity, and subframe offset). These configurations can be signaled to the UE via higher-layer signaling. Based on the subframe offsets and periodicity of CSI-RS and P-CSI reporting, the UE measures CSI-RS and reports P-CSI periodically with a predetermined timing relationship between CSI-RS and CSI reporting.

For Ap-CSI-RS and A-CSI reporting, at least three options are possible for signaling each of the three parameters associated with CSI-RS resource configuration (such as number of antenna ports, T-F pattern configuration, and port subset configuration).

A first option is to use RRC signaling per UE to perform semi-static (re)configuration of CSI-RS resource. Several served UEs can be configured to share a same CSI-RS resource assignment or have overlapping resource assignments.

A second option is to use UL grant by incorporating the parameter in an associated DCI which carries A-CSI request (trigger). Therefore, CSI-RS resource configuration is signaled dynamically.

A third option is to use periodic resource (re)configuration using a similar principle to semi-persistent scheduling (SPS). That is, an UL grant is used to signal a reconfigured CSI-RS resource assignment to a served UE-k. This CSI-RS resource assignment can be accompanied with A-CSI request (trigger) or signaled by itself. This periodic CSI-RS resource (re)configuration is performed every X ms where X can be configured via RRC signaling. The value of X can be chosen large such as in the order of 200-ms or 320-ms.

Comparing the three options, the third option allows a more dynamic resource reconfiguration (which is not possible with the first option since RRC configuration incurs large delay) without incurring large DL signaling overhead (which is the case with the second option). Therefore, it allows a more efficient pooling of Ap-CSI-RS resources with reasonable DL signaling overhead. To set up a UE for the third option, an RRC configuration similar to the one for SPS-ConfigDL (TS 36.331, REFS) can be used. Only a few parameters are applicable (for example, parameters similar to semiPersistSchedIntervalDL and/or numberOfConfSPS-Processes).

Considering the aforementioned three signaling options, applicable to each of the three parameters, TABLE 1-A and 1-B describe several possible combinations for the first and the second options of port subset selection, respectively.

TABLE 1-A

Options for DL signaling mechanism of CSI-RS resource configuration with fixed port subset selection (Alt 1)

| Alt | No. antenna ports $N_{PORT}$ | T-F pattern configuration |
|---|---|---|
| 1.1 | RRC signaling (semi-static) | RRC signaling (semi-static) |
| 1.2 | RRC signaling (semi-static) | Every UL grant which carries A-CSI request (dynamic) |
| 1.3 | RRC signaling (semi-static) | In one UL grant which carries A-CSI request (dynamic, semi-persistent) per X ms (X = CSI-RS resource reconfiguration periodicity) |
| 2.2 | Every UL grant which carries A-CSI request (dynamic) | Every UL grant which carries A-CSI request (dynamic) |
| 3.3 | In one DL assignment or UL grant which carries A-CSI request (dynamic, semi-persistent), e.g. per X ms (X = CSI-RS resource reconfiguration periodicity) or aperiodically | In one DL assignment or UL grant which carries A-CSI request (dynamic, semi-persistent), e.g. per X ms (X = CSI-RS resource reconfiguration periodicity) or aperiodically |

TABLE 1-B

Options for DL signaling mechanism of CSI-RS resource configuration with flexible port subset selection (Alt 2)

Signaling mechanism

| Alt | No. antenna ports $N_{PORT}$ | T-F pattern configuration | Port subset $\{Port(0), Port(1), \ldots, Port(N_{PORT} - 1)\}$ |
|---|---|---|---|
| 1.1.1 | RRC signaling (semi-static) | RRC signaling (semi-static) | RRC signaling (semi-static) |
| 1.1.2 | RRC signaling (semi-static) | RRC signaling (semi-static) | Every UL grant which carries A-CSI request (dynamic) |
| 1.1.3 | RRC signaling (semi-static) | RRC signaling (semi-static) | In one DL assignment or UL grant which carries A-CSI request (dynamic, semi-persistent), e.g. per X ms (X = CSI-RS resource reconfiguration periodicity) or aperiodically |
| 1.2.1 | RRC signaling (semi-static) | Every UL grant which carries A-CSI request (dynamic) | RRC signaling (semi-static) |
| 1.3.1 | RRC signaling (semi-static) | In one DL assignment or UL grant which carries A-CSI request (dynamic, semi-persistent), e.g. per X ms (X = CSI-RS resource reconfiguration periodicity) or aperiodically | RRC signaling (semi-static) |
| 1.2.2 | RRC signaling (semi-static) | Every UL grant which carries A-CSI request (dynamic) | Every UL grant which carries A-CSI request (dynamic) |
| 1.3.3 | RRC signaling (semi-static) | In one DL assignment or UL grant which carries A-CSI request (dynamic, semi-persistent), e.g. per X ms (X = CSI-RS resource reconfiguration periodicity) or aperiodically | In one DL assignment or UL grant which carries A-CSI request (dynamic, semi-persistent), e.g. per X ms (X = CSI-RS resource reconfiguration periodicity) or aperiodically |

TABLE 1-B-continued

Options for DL signaling mechanism of CSI-RS
resource configuration with flexible port subset selection (Alt 2)

Signaling mechanism

| Alt | No. antenna ports $N_{PORT}$ | T-F pattern configuration | Port subset $\left\{ \begin{array}{l} Port(0), Port(1), \ldots, \\ Port(N_{PORT} - 1) \end{array} \right\}$ |
|---|---|---|---|
| 2.2.2 | Every UL grant which carries A-CSI request (dynamic) | Every UL grant which carries A-CSI request (dynamic) | Every UL grant which carries A-CSI request (dynamic) |
| 3.3.3 | In one DL assignment or UL grant which carries A-CSI request (dynamic, semi-persistent), e.g. per X ms (X = CSI-RS resource reconfiguration periodicity) or aperiodically | In one DL assignment or UL grant which carries A-CSI request (dynamic, semi-persistent), e.g. per X ms (X = CSI-RS resource reconfiguration periodicity) or aperiodically | In one DL assignment or UL grant which carries A-CSI request (dynamic, semi-persistent), e.g. per X ms (X = CSI-RS resource reconfiguration periodicity) or aperiodically |

For each of the options in TABLE 1-A and 1-B, at least a CSI request field in the DCI of an UL grant (which includes an associated aperiodic CSI-RS) is needed to trigger A-CSI. The CSI request field can include one or multiple bits where each bit is associated with a cell. In addition, Ap-CSI-RS parameter(s) which need to be configured dynamically (a subset of the number of ports, T-F pattern configuration, and/or port subset) are also included in the DCI of the UL grant. These configuration parameters can be defined as separate parameters or jointly with the CSI request field.

When a UE is configured with K CSI-RS resources (or resource configurations), one CSI request field (which can include one or multiple bits) can be used for each of the K CSI-RS resources (or resource configurations). When k of these K CSI request fields are set to 1, CSI-RS associated with each of these k CSI-RS resources (or resource configurations) is transmitted in the DL subframe containing the UL grant.

When a UE is configured with two (possibly different) CSI reporting (analogous to LTE eMIMO-Type) setups or CSI-RS levels within one CSI process where each eMIMO-Type setup is associated with one or more CSI-RS resources (or resource configurations), one CSI request field (which can include one or multiple bits) can be used for each of the two eMIMO-Type setups. When either one or both CSI request fields are set to 1, CSI-RS associated with each triggered eMIMO-Type setup is transmitted in the DL subframe containing the UL grant.

When a combination of semi-static (RRC signaling) and either semi-persistent or dynamic signaling is used (such as Alt 1.1, 1.2, or 1.3 in TABLE 1-A; Alt 1.1.1, 1.1.2, 1.1.3, 1.2.1, 1.3.1, 1.2.2, or 1.3.3 in TABLE 1-B), at least one (non-zero-power NZP or zero-power ZP) CSI-RS resource configuration parameter is semi-statically configured and at least one CSI-RS resource configuration parameter is either semi-persistently or dynamically configured. In this case, the semi-static CSI-RS resource configuration effectively indicates that the UE is semi-statically configured with a plurality of ($K_A$) CSI-RS resources (where $K_A$ is the number of possible CSI-RS resources or resource configurations associated with the semi-statically configured parameters). The second signaling—either semi-persistent or dynamic—selects one CSI-RS resource or a subset of CSI-RS resources from the $K_A$ semi-statically configured CSI-RS resources.

Therefore, instead of defining CSI-RS resources in terms of parameters, the semi-static (higher-layer or RRC) signaling can instead configure the UE a set of $K_A$ CSI-RS resources and the semi-persistent or dynamic signaling can select one of out of $K_A$ CSI-RS resources. Each of these CSI-RS resources can either be NZP or ZP.

In the present disclosure, several embodiments of CSI-RS resource (re)configuration scheme (referred above as semi-persistent resource reconfiguration) with at least one CSI-RS resource configuration parameter signaled using the third option are given.

In a first embodiment (embodiment 1.A), an activation-release/deactivation mechanism similar to semi-persistent scheduling is utilized to reconfigure CSI-RS resource. In this embodiment, UL grants or DL assignments on L1 DL control channels (analogous to LTE PDCCH or EPDCCH) are used to reconfigure CSI-RS resource. Therefore, an UL grant or DL assignment used for this purpose includes at least one DCI field either for selecting one out of multiple choices of CSI-RS resource configuration (which are, for instance, configured via higher layer signaling as a part of CSI-RS resource configuration ASN.1 Information Element) or for setting the value of at least one CSI-RS resource configuration parameter. This field can be a part of an existing DCI format (such as that analogous to LTE DCI format 0 or 4 for UL grant, or format 1A, 2/2A/2B for DL assignment) or a new DCI format specifically designed for CSI-RS resource reconfiguration (activation/deactivation). The UL grant (or DL assignment) is signaled to the UE via PDCCH or EPDCCH and masked by a special RNTI (such as CSI-RNTI).

Figure 11:
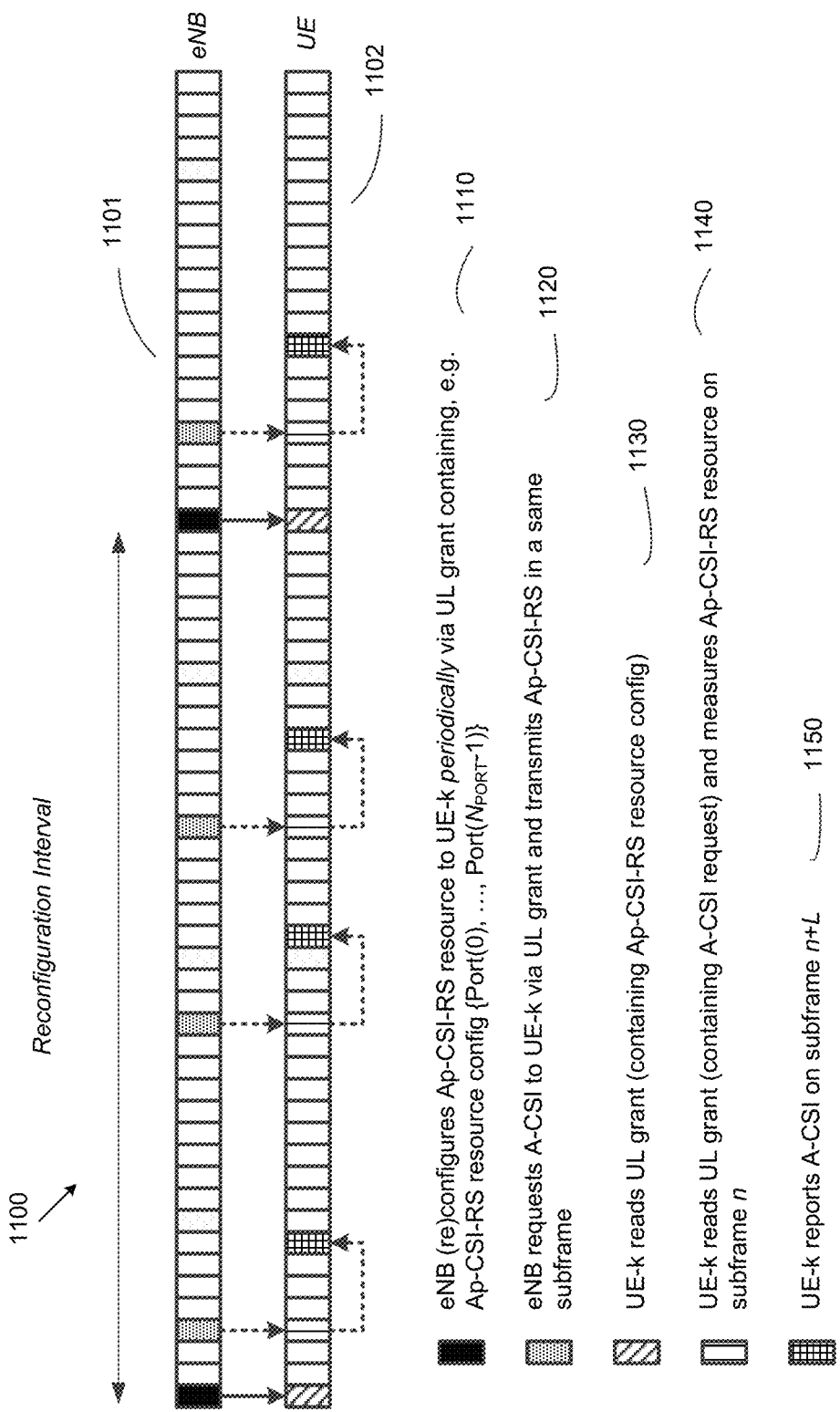
FIG. 11 illustrates an example eNB and UE operations for semi-persistent CSI-RS according to embodiments of this disclosure.

FIG. 11 illustrates example eNB and UE operations in terms of timing diagram 1100 associated with eNB in 1101 and UE in 1102 wherein at least one CSI-RS resource configuration parameter is signaled using the third option according to embodiments of this disclosure. For example, this corresponds to Alt 1.3 or 3.3 in TABLE 1-A, or Alt 1.1.3, 1.3.1, 1.3.3, or 3.3.3 in TABLE 1-B. In this embodiment, Ap-CSI-RS resource is reconfigured every X ms in subframe(s) 1110 via an UL grant (or an UL-related grant or, alternatively, a DL assignment) which carries Ap-CSI-RS resource configuration information (including the DCI field mentioned above). This configuration information can be accompanied with an A-CSI request/trigger or signaled by itself. Upon receiving a DL subframe from 1110, a served UE-k reads the configuration information in 1130. Based on this configuration information, the eNB requests A-CSI to UE-k via an UL grant (containing A-CSI trigger) while transmitting Ap-CSI-RS within the same subframe(s) 1120. Upon receiving a DL subframe from 1140—containing an A-CSI request/trigger—UE-k measures the transmitted Ap-CSI-RS (in subframe n) according to the resource configuration information received in subframe(s) 1130, and performs CSI calculation. The resulting A-CSI is reported to the eNB in subframe(s) 1150. In the example in FIG. 11, the semi-persistently configured CSI-RS resource includes a set of the number of ports.

Although the above example assumes periodic resource reconfiguration (every X ms), aperiodic resource reconfiguration using activation and deactivation based on UL grant or DL assignment can also be used.

The above semi-persistent CSI-RS resource allocation mechanism, applied to NZP CSI-RS resource, can be described as follows. First, a UE receives a dynamic trigger/release containing a selection from multiple higher-layer-configured NZP CSI-RS resources. These multiple CSI-RS resources can be associated with a first set of configured parameters (set values of CSI-RS resource configuration parameters) or simply a list of $K_A$ CSI-RS resources. Likewise, dynamic trigger or release can indicate either a $\lceil \log(K_A) \rceil$-bit DCI field or another set of parameters which, together with the first parameter set, further indicates the selected CSI-RS resource. In this embodiment, each NZP CSI-RS resource can be either periodic or aperiodic CSI-RS resource. Second, for an activation trigger received in subframe n, the transmission of the associated NZP CSI-RS resource will start no earlier than subframe n+Y1 where Y1>0. Third, for a release (deactivation) trigger received in subframe n, the transmission of the associated NZP CSI-RS resource will stop after subframe n+Y1 where Y1>0. Fourth, if an UL grant or UL grant-like mechanism is used to trigger CSI-RS which is placed or transmitted in a same subframe as the UL grant, the value of Y1 or Y2 can be aligned with that of A-CSI. The same holds if a DL grant is used instead.

In a second embodiment (embodiment 1.B), an activation-release/deactivation mechanism (similar to semi-persistent scheduling) is also utilized to reconfigure CSI-RS resource, but instead of using PDCCH, MAC control element (MAC CE) is used. Here, a new type of MAC CE can be defined for the purpose of reconfiguring CSI-RS resource. For example, this type of MAC CE can be termed "CSI-RS resource reconfiguration MAC control element (MAC CE)".

This CSI-RS resource reconfiguration MAC CE is signaled to the UE via DL-SCH and included in a MAC PDU. Since the number of CSI-RS resource configuration parameters (as well as the length of each parameter) included in the MAC CE remains the same, the size of CSI-RS resource reconfiguration MAC CE can be fixed. An example of a MAC CE design for CSI-RS resource reconfiguration includes at least one CSI-RS resource configuration parameter, each written as a binary (bit) sequence and arranged in an octet-aligned format. For instance, if all the three parameters mentioned above (number of ports, T-F pattern, and port number set) are configurable via a MAC CE, three fields are included in the CSI-RS resource configuration MAC CE.

The above semi-persistent CSI-RS resource allocation schemes (the first and the second embodiments) can also be used for zero-power (ZP) CSI-RS resource which can be used for interference measurement.

The above semi-persistent CSI-RS resource allocation schemes (the first and the second embodiments are used and applicable for aperiodic CSI-RS. In another example, these first and the second embodiments can also be applied to periodic CSI-RS (that which is associated with subframe configuration in CSI-RS resource configuration—such as subframe offset and periodicity). When applied to periodic CSI-RS, each of the two schemes can be used to start/activate or stop/deactivate CSI-RS measurement at a UE. For the first embodiment, a DCI field in an UL grant or a DL assignment is used to signal the start or the stop of CSI measurement associated with a selected CSI-RS resource. For the second embodiment, the CSI-RS resource reconfiguration MAC CE is used to signal the start or the stop of CSI measurement associated with a selected CSI-RS resource.

For either embodiment, two possibilities exist. First, the size and content of the DCI field (first embodiment) or MAC CE (second embodiment) can be different from that used for aperiodic CSI-RS. In this case, the selected CSI-RS resource is configured for the UE via higher layer signaling. Therefore, the DCI field (first embodiment) or the MAC CE (second embodiment) simply signals START (activate) or STOP (deactivate). Second, the size and content of the DCI field (first embodiment) or MAC CE (second embodiment) are identical to that used for aperiodic CSI-RS. In this case, the selected CSI-RS resource is indicated in the DCI field (first embodiment) or the MAC CE (second embodiment)—selected out of a plurality of ($K_A$) resources which are configured for the UE via higher-layer signaling—in the same manner as that for aperiodic CSI-RS.

The above embodiments pertain to CSI-RS design which enables efficient resource allocation mechanism for next generation cellular systems. Additionally, there is a need to enhance the existing synchronization and cell search procedure for new communication systems such as 5G at least for the following reasons. First, beamforming support. In order to meet link budget requirements for operation in high carrier frequency bands, such as ones above 6 GHz, beamforming is required for transmissions by an eNB (and possibly also by a UE). Therefore, the aforementioned synchronization and cell search procedure (see also REF 1) needs to be updated for beamforming support. Second, large bandwidth support. For operation with large system bandwidths, such as 100 MHz or above, a different sub-carrier spacing than the one for operation in the smaller system bandwidths can apply and such design needs to be considered for the synchronization and cell search procedure design. Third, improved coverage. For some applications, such as ones associated with a requirement for increased coverage that can occur due to placements of UEs in locations experiencing a large path loss, the synchronization and cell search procedure needs to support enhanced coverage and increased repetitions of synchronization signals. Fourth, improved performance. The synchronization performance of the aforementioned procedure (as also described in REF 1) is limited due to false alarms caused by the partitioning a cell ID into 1 PSS and 2 SSS, thereby leading to invalid combinations of primary/secondary synchronization signal (PSS/SSS) that cannot completely resolved by scrambling. A new synchronization procedure can be designed with improved false alarm performance. Fifth, support for variable TTI. In current LTE Rel-13, the TTI duration is fixed. However, for 5G systems, the TTI is expected to be variable due to support for different sub-carrier spacings, low latency considerations etc. In this scenario with variable TTI, the mapping of the synchronization sequences and cell search within the frame needs to be specified.

The present disclosure includes at least the following five components for cell search and synchronization signal designs: cell search procedure, PSS design, SSS design, primary broadcast channel (PBCH) design, and their associated frame structure.

For the first component (that is, cell search procedure), one embodiment can be described as follows. In one embodiment of the disclosure, a UE scans for a single symbol or multiple symbol PSS configuration transmitted by an eNB based on a frequency band pre-configured in the UE. A minimum bandwidth and sub-carrier spacing used by the UE is also dependent on the frequency band pre-configuration.

Figure 12:
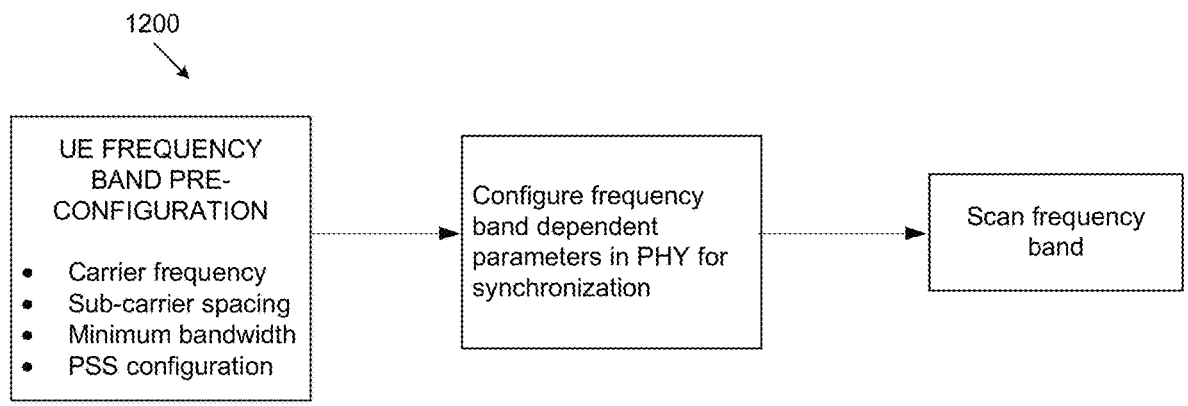
FIG. 12 illustrates an example operating procedure for synchronization according to embodiments of this disclosure.

FIG. 12 illustrates an example operating procedure 1200 for synchronization according to embodiments of this disclosure. Frequency band dependent parameters such as sub-carrier spacing, minimum bandwidth, and PSS configuration are configured based on a frequency band that a UE scans. Based on the pre-configuration, the radio frequency (RF) and physical layer parameters, such as the correlator and the synchronization sequences, are adjusted for synchronization to scan in the frequency band.

For example, when a UE scans for a 28 GHz band (mmWave cellular band), the UE scans for a 4 symbol PSS configuration with a sub-carrier spacing of 75 KHz. When the UE scans in a 3 GHz band (existing cellular band), the UE scans for a single symbol PSS configuration with sub-carrier spacing of 15 KHz. When the UE scans in 700 MHz band (IoT cellular band), the UE scans for multiple symbol PSS configuration with sub-carrier spacing of 3.75 KHz.

In another example, when a UE scans for a 28 GHz band (mmWave cellular band), the UE scans for a 8 symbol PSS configuration with a sub-carrier spacing of 60 KHz. When the UE scans in a 3 GHz band (existing cellular band), the UE scans for a single symbol PSS configuration with sub-carrier spacing of 15 KHz. When the UE scans in 700 MHz band (IoT cellular band), the UE scans for multiple symbol PSS configuration with sub-carrier spacing of 3.75 KHz.

This embodiment also covers examples wherein a plurality of PSS configurations is supported and each PSS configuration can be associated with at least one class of frequency bands. The PSS configuration includes (but is not limited to) the number of PSS symbols, sequence and/or waveform choice and length, location in time and/or frequency domain, the number of cell-specific hypotheses, or the number of possible sequences for PSS.

Another embodiment does not explicitly associate PSS configuration with a frequency band. Instead, it defines a plurality of PSS configuration sets wherein each set includes PSS characteristics such as the number of PSS symbols, sequence and/or waveform choice and length, location in time and/or frequency domain, the number of cell-specific hypotheses, or the number of possible sequences for PSS.

For example, SS Type 1 uses a 4-symbol PSS configuration with a sub-carrier spacing of 75 KHz. SS type 2 uses a single symbol PSS configuration with sub-carrier spacing of 15 KHz. SS type 3 uses multiple symbol PSS configuration with sub-carrier spacing of 3.75 KHz.

In another embodiment, UE simultaneously examines multiple hypotheses and scans for both multiple symbol PSS and single symbol PSS. This can be beneficial if there is no pre-configuration for the number of repetitions and the UE blindly tries both options for synchronization.

In another embodiment, the synchronization signal transmission can be carrier-agnostic. That is, the same numerology is used for the sync irrespective of the carrier frequency. The sync uses a fixed bandwidth and numerology that is common for all UEs irrespective of carrier frequency. Even though UEs can support different numerologies and operate in different bands, they are required to support the detection of the sync based on this common numerology.

To mitigate sync overhead to support beamforming and to support high speed scenarios, the default carrier spacing can be different than the 15 KHz spacing used in LTE. For example, 30 KHz or 60 KHz spacing could be considered as the default numerology for initial access.

For the second component (that is, PSS design), one embodiment can be described as follows. In one embodiment of the present disclosure, both single symbol and multiple symbol PSS transmissions are supported. A number of sequences available for the PSS transmission is denoted by P. Each symbol in the PSS configuration is used to transmit a different PSS sequence, derived from a different root u of a ZC sequence. Each PSS sequence $S_i$ ($1 \le i \le P$) is a ZC sequence of length $N_{ZC}$ that is the closest prime number less than the minimum bandwidth supported in a given frequency band divided by a respective sub-carrier spacing used for PSS transmission in the frequency band. Each PSS sequence is constructed in the frequency domain with a middle element punctured to avoid transmitting on the DC sub-carrier. When PSS transmission is over multiple symbols, the multiple PSS transmissions are in contiguous adjacent symbols. Each repetition of a multi-symbol PSS transmission can be in a same direction, that is with a same precoding (repetitions can be for coverage enhancements or to enable per-UE beamforming) or in different directions using different precoding (for eNB beamforming).

Figure 13:
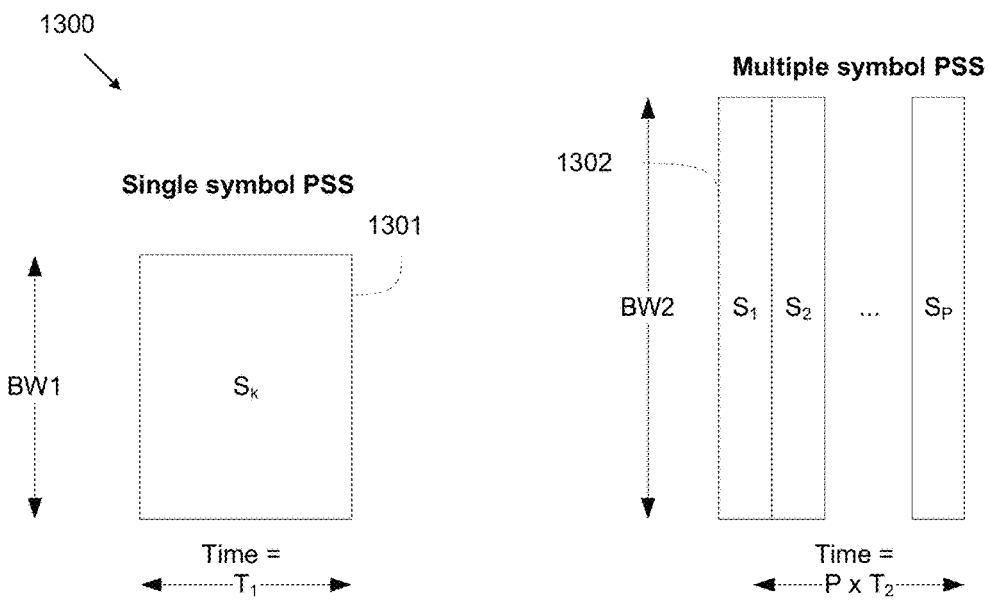
FIG. 13 illustrates an example PSS transmission over a single symbol and over multiple symbols according to embodiments of this disclosure.

FIG. 13 illustrates an example PSS transmission scheme 1300 applied over a single symbol (P=1) and over multiple symbols (P>1) according to embodiments of this disclosure. A single symbol PSS transmission 1301 using sub-carrier spacing $f_{SC,1}$ occupies bandwidth BW1=$N_{ZC} \times f_{SC,1}$ and time $T_1$. A multiple symbol PSS transmission 1302 using sub-carrier spacing $f_{SC,2}$ occupies bandwidth BW2=$N_{ZC} \times f_{SC,2}$ and time $P \times T_2$.

In one embodiment of this disclosure, PSS sequences are transmitted as complex conjugate pairs to eliminate timing ambiguity from integer frequency offsets. For example, when P=4 and $N_{ZC}$=63, PSS sequences can be based on the root indices u={34, 29, 25, 38}.

In case of single symbol PSS transmission, each cell can select one of the available P sequences. For example, when PSS set is based on the root indices u={34, 29, 25, 38}, each cell can select of the P=4 sequences. For example, when cell 1 transmits PSS based on root index {34}, cell 2 can transmit PSS based on root index {29}. Only ⌈P/2⌉ correlators are required due to the complex conjugate property of ZC sequences chosen for PSS, where ⌈ ⌉ is the ceiling function that rounds a number to its next larger integer.

Figure 14A:
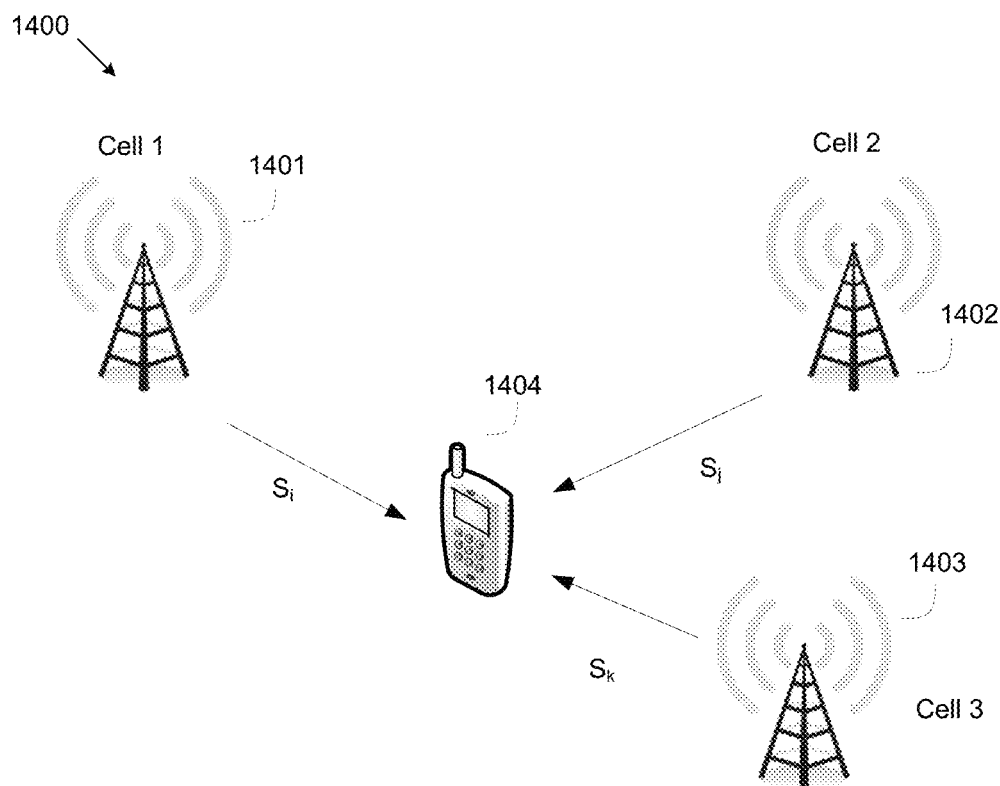
FIG. 14A illustrates an example of a single symbol PSS transmission from multiple cells where the UE receives different PSS from neighboring cells according to embodiments of this disclosure.

FIG. 14A illustrates an example of a single symbol PSS transmission from multiple cells where the UE receives different PSS from neighboring cells in a wireless network 1400 according to embodiments of this disclosure. The figure shows the UE 1404 receiving different PSS transmissions $\{S_i, S_j, S_k\}$ from cells 1401, 1402 and 1403 respectively, where $1 \le i, j, k \le P$ and $i \ne j \ne k$.

At the UE, multiple correlators are used to detect the PSS from current and neighboring cells. In one example, a UE has 2 correlators, one for u={34, 29} and another for u={25, 38}. Correlator 1 detects PSS transmission from cell 1 while correlator 2 detects PSS transmission from cell 2. This approach can mitigate the SFN effect that can occur when all cells transmit a same PSS sequence, making it difficult to estimate the timing when the correlator output exceeds the CP length.

In case of multiple symbol PSS transmission, each cell can transmit all P sequences $S_1, S_2, \ldots, S_P$. The PSS transmissions over multiple symbols can have a different precoding per symbol or can have a same precoding. Since each repetition uses a different PSS sequence, a UE can determine the position of the PSS repetition within a subframe based on the PSS sequence the UE detects for synchronization.

A different precoding is used per symbol in a beamforming mode. In this case, a PSS transmission sequence can be rotated in adjacent cells. A UE scans in parallel for multiple symbols using separate correlators. The rotation can be such that different correlators are triggered at the UE when the UE receives multiple PSS sequences from a current cell as well as from neighboring cells.

Figure 14B:
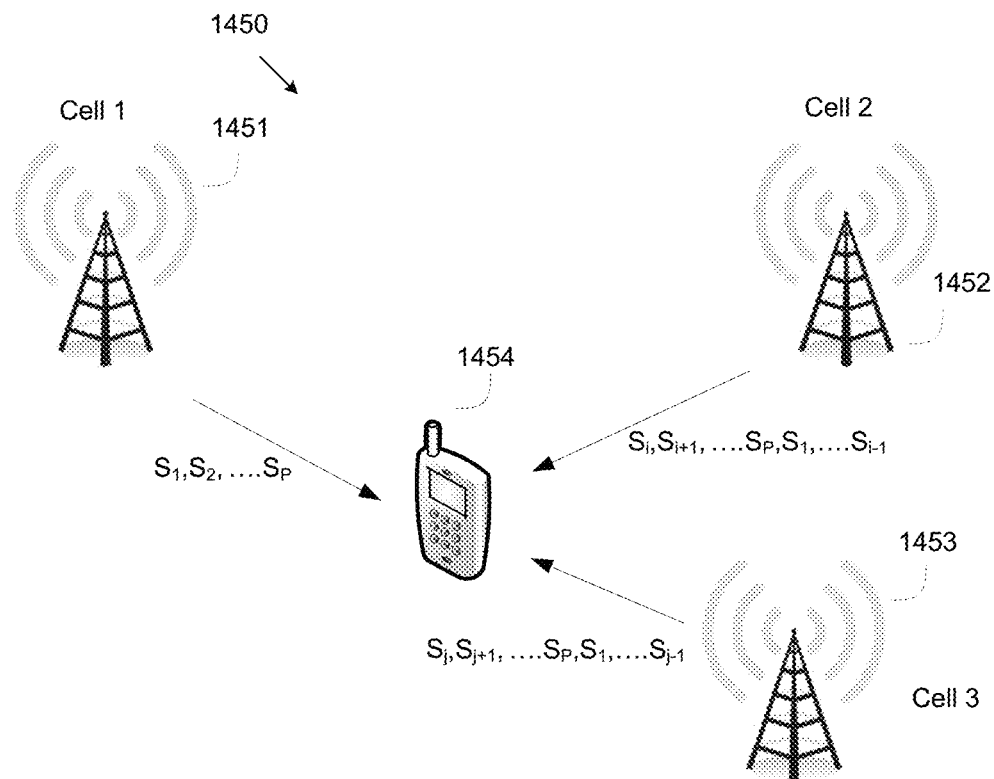
FIG. 14B illustrates an example for multiple symbol transmission with the PSS sequences being rotated for multiple cells according to embodiments of this disclosure.

FIG. 14B illustrates an example for multiple symbol transmission with the PSS sequences being rotated for multiple cells to minimize triggering the same correlator for the transmission from the neighboring cells in a wireless network 1450 according to embodiments of this disclosure. Cell 1 1451 transmits PSS using sequences $\{S_1, S_2, \ldots, S_P\}$ to the UE 1454. Cell 2 1452 transmits $\{S_i, S_{i+1}, \ldots, S_P, S_1, \ldots, S_{i-1}\}$ which triggers a different correlator for the UE 1454. Cell 3 1453 transmits $\{S_j, S_{j+1}, \ldots, S_P, S_1, \ldots, S_{j-1}\}$ which triggers yet another correlator for the UE 1454. Hence, the SFN effect is not seen and the UE 604 can easily distinguish the transmissions from the different cells.

For example, when 4 symbols are used for a PSS transmission and cell 1 transmits PSS based on root indices u={34, 29, 25, 38}, cell 2 can transmit based on root indices {25, 38, 34, 29}. Assuming UE has 2 correlators, one for u={34, 29} and another for u={25, 38}, correlator 1 detects PSS transmission from cell 1 while correlator 2 detects PSS transmission from cell 2. This mitigates the SFN effect due to multiple repetitions when all cells transmit a same sequence leading to ambiguity in both the repetitions from the current cell as well as the transmissions from the neighboring cell. A UE can assume that a same precoding and repetition pattern applies to other broadcast signals such as SSS and PBCH. This enables support for beamforming from the eNB.

A same precoding for all PSS transmission symbols can be used in a coverage enhancement mode. In this case, a UE receiver can use a single long correlator to correlate across multiple symbols and obtain a processing gain needed for enhanced coverage. The SFN effect is not an issue since UEs are coverage limited (not interference limited) in this mode. Alternate structures with smaller correlators can also be used for reduced complexity considerations when frequency error is small and correlator outputs can be combined for achieving the desired processing gain.

Figure 15:
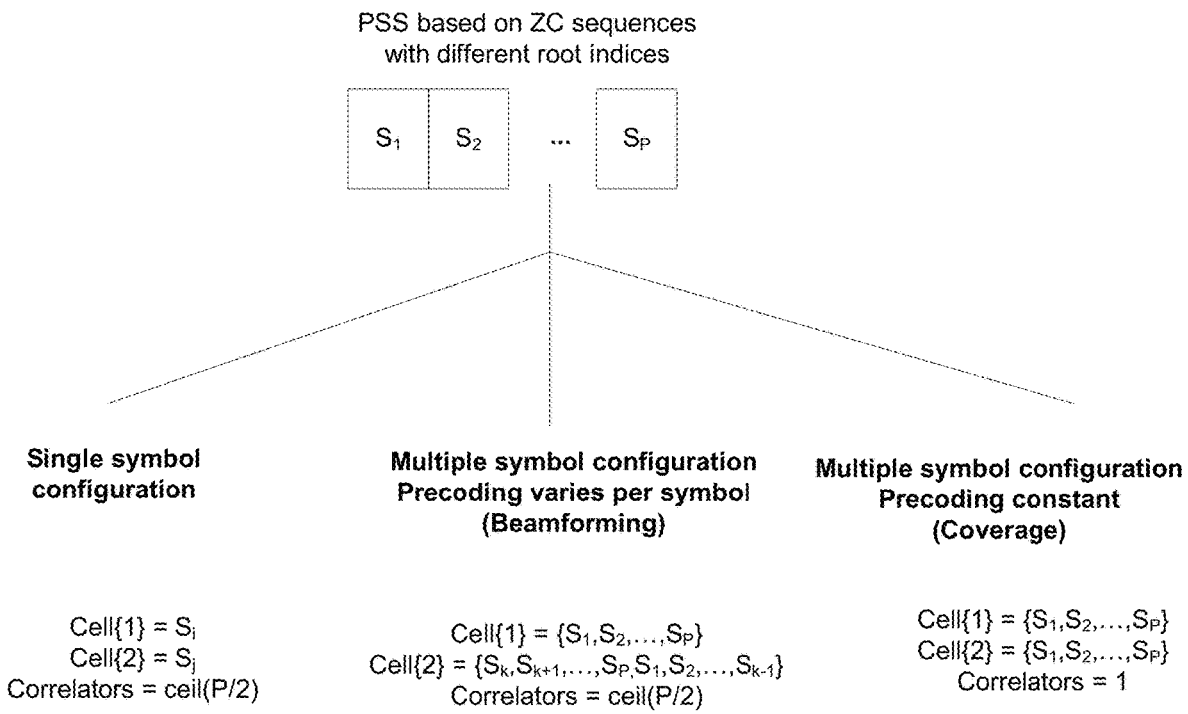
FIG. 15 illustrates examples of PSS transmission design for single and multiple symbol PSS configuration according to embodiments of this disclosure.

FIG. 15 illustrates different options for PSS transmission design for single and multiple symbol PSS configuration, according to embodiments of this disclosure. The P symbols used for PSS transmission are denoted by $\{S_1, S_2, \ldots, S_P\}$.

PSS transmissions including a combination of precoding and repetition is also possible to support UE beamforming for synchronization. This can be done in multiple ways. In one method, each precoding is repeated M times before switching to the next beam. In this case, the transmissions can be $\{S_1, S_1, S_1, \ldots M \text{ times}, S_2, S_2, S_2, \ldots, S_P\}$ requiring P*M transmissions. In this scheme, the UE continuously switches its beam P*M times while the eNB holds its beam for M symbols. In another method, the transmissions can be $\{S_1, S_2, \ldots S_P, S_1, S_2, \ldots, S_P, S_1, S_2, \ldots, S_P, \ldots M \text{ times}\}$. In this case, the UE holds its current beam for P symbols before switching to another beam while the eNB is continuously switching its beam.

In order to distinguish between normal CP and extended CP and to distinguish between FDD and TDD operation, different locations within a frame can be used for the PSS transmission symbols. A UE can perform blind detection for hypotheses derived from the possible combinations in order to determine a combination, such as FDD and normal CP, used for PSS transmission.

In one embodiment of this disclosure, the PSS is used only for coarse synchronization and a SSS provides a cell ID.

Figure 16A:
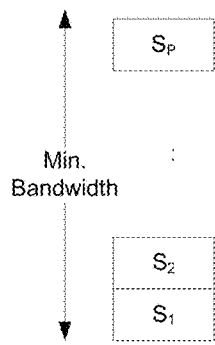
FIG. 16A-16C illustrate examples where the PSS is extended in the frequency domain according to embodiments of this disclosure.
Figure 16B:
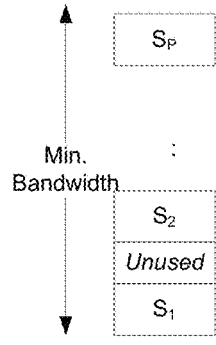
Figure 16C:
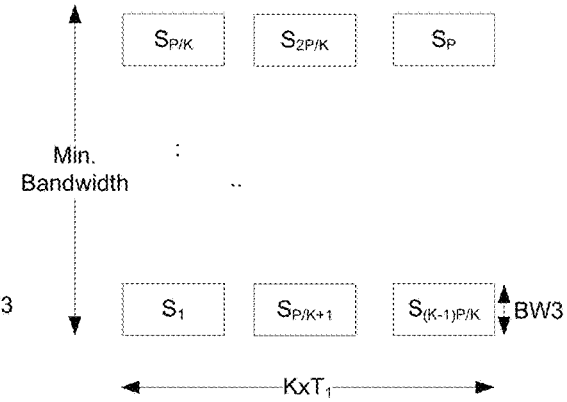

The above embodiments utilize multiple-symbol configuration to lengthen or extend the PSS and therefore introduce time diversity. In another embodiment, this PSS extension operation is performed in frequency domain. FIGS. 16A-16C illustrate examples where the PSS is extended in the frequency domain according to embodiments of this disclosure. That is, a PSS can be composed of P segments of RE groups, whether adjacent as shown in FIG. 16A or distributed in frequency domain as shown in FIG. 16B, where different segments carry different frequency domain ZC sequences. Each segment uses bandwidth $BW3=N_{ZC} \times f_{SC,1}$ where $f_{SC,1}$ is the sub-carrier spacing. In this case, $N_{ZC}$ is not derived from the minimum bandwidth but is fixed to a pre-determined value. Hybrid designs could also be considered where a portion of the PSS extension is done in the time domain while another portion is done in the frequency domain, as shown in FIG. 16C. This could be useful to concentrate the power in the time domain into fewer resources while minimizing overhead for multiple repetitions.

Figure 16D:
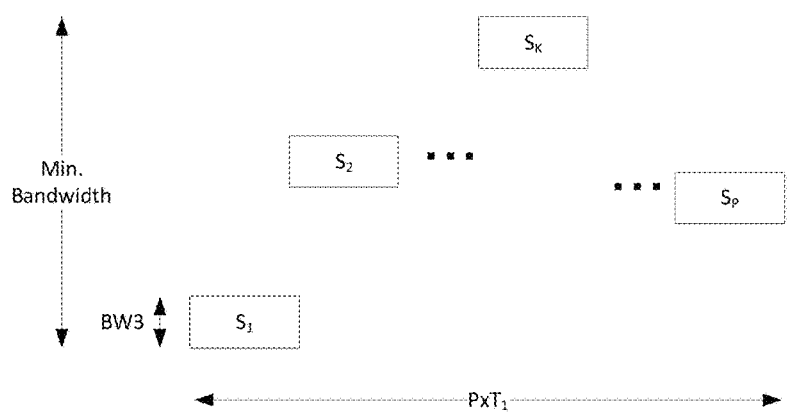
FIG. 16D illustrates an example where the UE scans for the PSS extensions in different RE groups according to embodiments of this disclosure.

Yet another embodiment is to perform PSS extension both in time and frequency domains. Here the P segments occupy P symbols and different PSS segments are placed at different RE groups according to a predetermined hopping pattern. FIG. 16D illustrates an example where the UE scans for the PSS extensions in different RE groups, based on a known hopping pattern within the specified bandwidth, for example, after detecting a first PSS symbol $S_i$ at a predetermined location according to embodiments of this disclosure. Using a plurality of hopping patterns can increase the number of cell-specific hypotheses (such as partial PCI or other cell-specific parameters).

The use of ZC sequences in the above embodiments is exemplary. Other sequences based on sequence group with good auto-correlation and cross-correlation property, such as M-sequences or Golay codes, can also be used. The sequence can be inserted either in time or frequency domain.

For the third component (that is, SSS design), one embodiment can be described as follows. In one embodiment, both single and multiple symbol SSS transmissions are supported. SSS sequences are generated using maximum length sequences, also known as M-sequences of length M. A SSS sequence is constructed in the frequency domain. A SSS transmission uses a same sub-carrier spacing and bandwidth as a PSS transmission. In the case of multiple symbol SSS transmission, a number of repetitions and a precoding operation (beamforming or no beamforming) of the SSS transmission are also same as for a PSS transmission. Each cell uses a different SSS sequence that provides a respective Cell ID. Unlike a PSS sequence, a SSS sequence does not change during repetitions for coverage or for beamforming.

Figure 17:
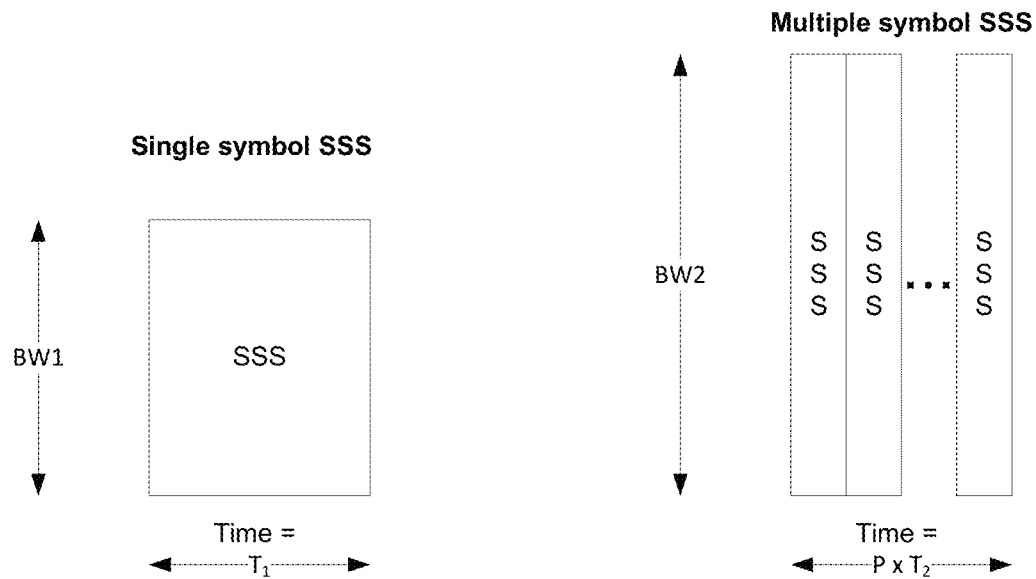
FIG. 17 illustrates an example SSS transmission for single and multiple symbol transmission according to embodiments of this disclosure.

FIG. 17 illustrates an example SSS transmission for single and multiple symbol transmission according to embodiments of this disclosure. For the fourth component (that is, PBCH design), one embodiment can be described as follows. In one embodiment, a UE does not know whether or not an eNB applies beamforming until the UE decodes a PBCH. The PBCH transmission also uses a same sub-carrier spacing, and precoding operation as the PSS and SSS transmissions.

Information on a symbol offset from a first PSS/SSS transmission can be encoded in a master information block (MIB) conveyed by the PBCH for a UE to confirm a symbol timing within the sub-frame for multiple repetitions of the PBCH transmission. This can be useful in cases where multiple symbols were detected for the PSS and SSS during a multiple symbol transmission and the UE wants to confirm that it has estimated the symbol timing index within the sub-frame correctly.

Figure 18:
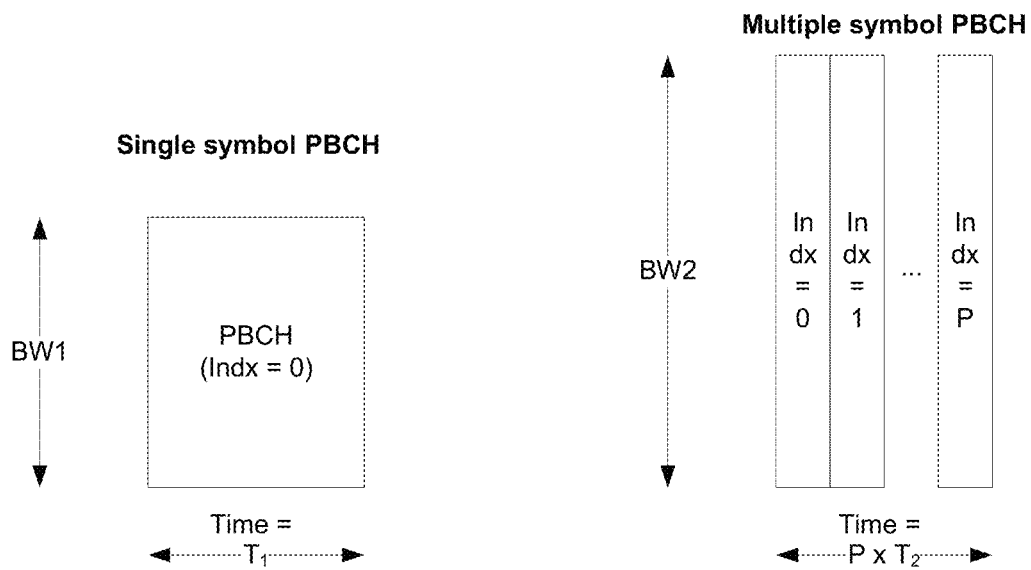
FIG. 18 illustrates an example where a symbol offset information is included in a Master Information Block (MIB) transmitted via PBCH according to embodiments of this disclosure.

FIG. 18 illustrates an example where a symbol offset information is included, as shown by a variable Indx, in a Master Information Block (MIB) transmitted via PBCH according to embodiments of this disclosure.

A UE decodes contents of a MIB in a PBCH and confirms its symbol position among symbol positions for a transmission with multiple repetitions. Once a UE detects a MIB in PBCH transmission, the UE can initiate unicast data and control channel transmission or reception based on a scheduling configuration by the eNB.

For the fifth component (that is, associated frame structure), one embodiment can be described as follows. In case of single symbol PSS/SSS transmission, in one embodiment of this disclosure, the eNB transmits the PSS as a last symbol of a sub-frame and the eNB transmits the SSS as the first symbol of the next sub-frame. The eNB then transmits the PBCH on the subsequent subframe. Sending the PSS in the last slot helps with acquiring the PSS independent of whether a normal CP or extended CP is used. Also, using $2^{nd}$ slot in the sub-frame allows the PSS, SSS, PBCH to be repeated across the sub-frame for multiple symbol transmissions, if desired. The first PSS transmission always occurs at sub-frame #0. The PSS and SSS are repeated exactly 5 msec apart in the frame irrespective of the TTI duration.

Figure 19A:
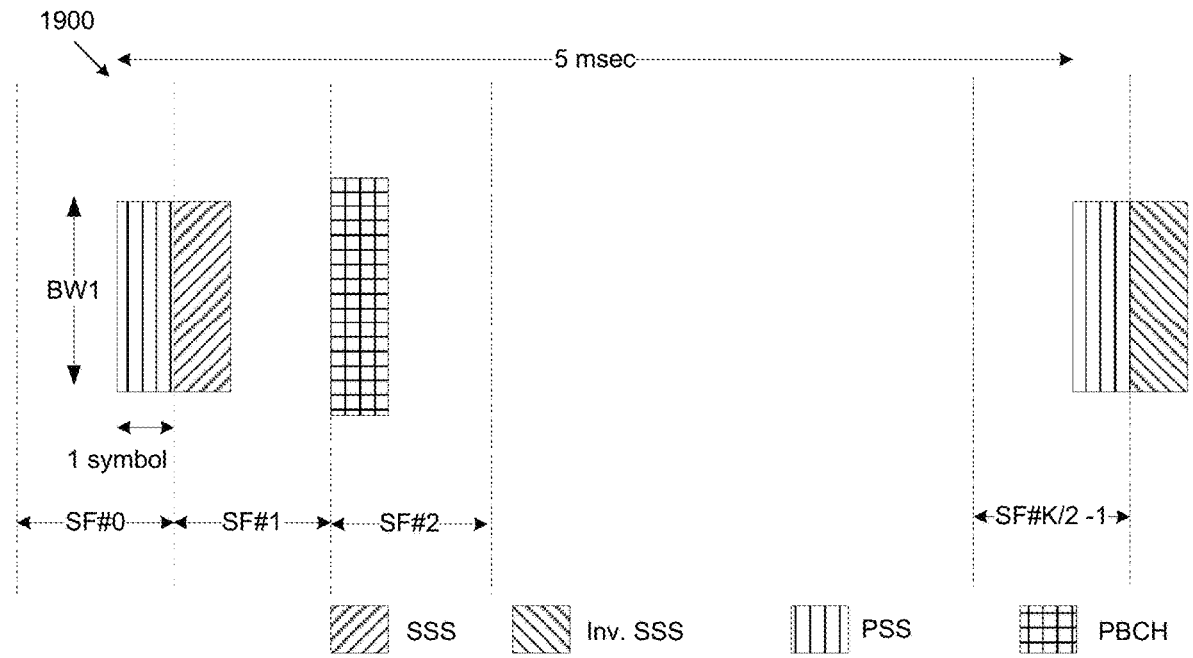
FIG. 19A illustrates an example frame structure that shows the placement of the PSS, SSS and PBCH for a single symbol transmission according to embodiments of this disclosure.

FIG. 19A illustrates an example frame structure 1900 that shows the placement of the PSS, SSS and PBCH for a single symbol transmission according to embodiments of this disclosure. The second repetition of the SSS is inverted so that the UE can determine the location and repetition in the frame from a single observation of the SSS. If there are K sub-frames per 10 msec frame, PSS is sent at sub-frame SF#0 and SF#K/2−1, where sub-frame SF#0 denotes the start of the frame.

In case of multiple symbol PSS/SSS transmission, in one embodiment of this disclosure, the PSS sequences are transmitted sequentially in reverse order starting from a last symbol of a sub-frame while the SSS repetitions are transmitted sequentially starting from the first symbol of the next sub-frame. The PBCH repetitions is then transmitted on the subsequent subframe. If precoding is applied, the same precoder is applied for each PSS, SSS, PBCH transmission.

Figure 19B:
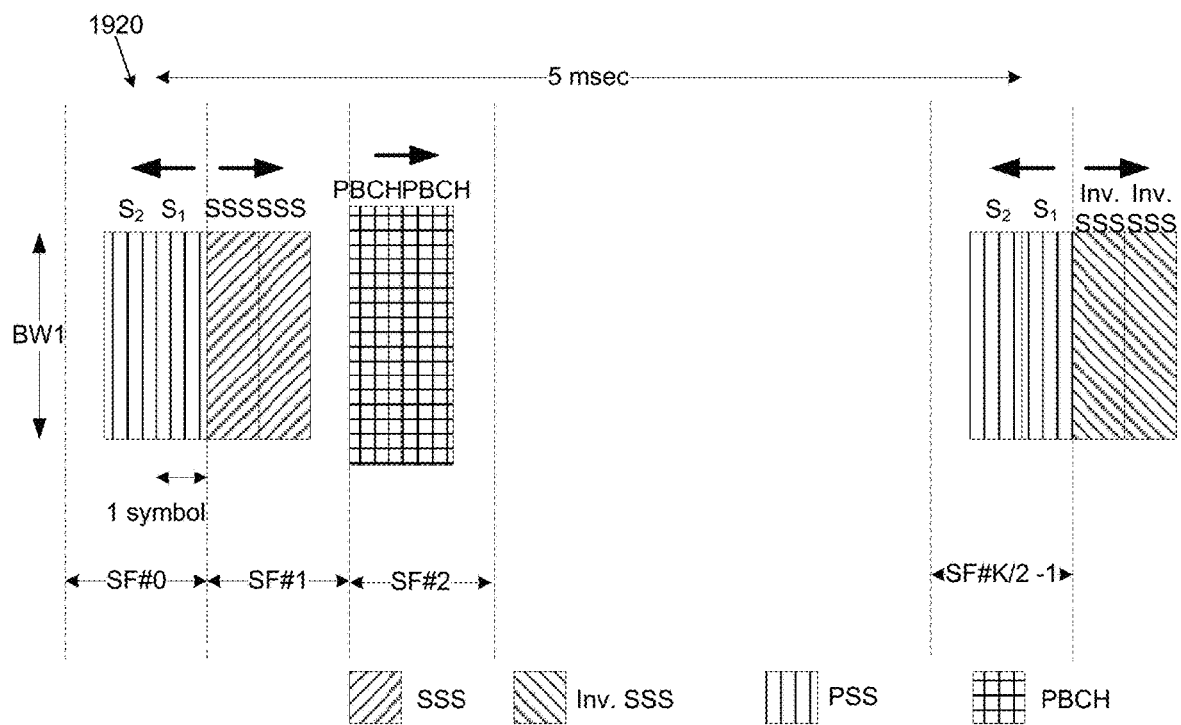
FIG. 19B illustrates an example frame structure that shows the placement of the PSS, SSS and PBCH for a multiple symbol transmission according to embodiments of this disclosure.

FIG. 19B illustrates an example frame structure 1920 that shows the placement of the PSS, SSS and PBCH for a multiple symbol transmission according to embodiments of this disclosure.

Figure 19C:
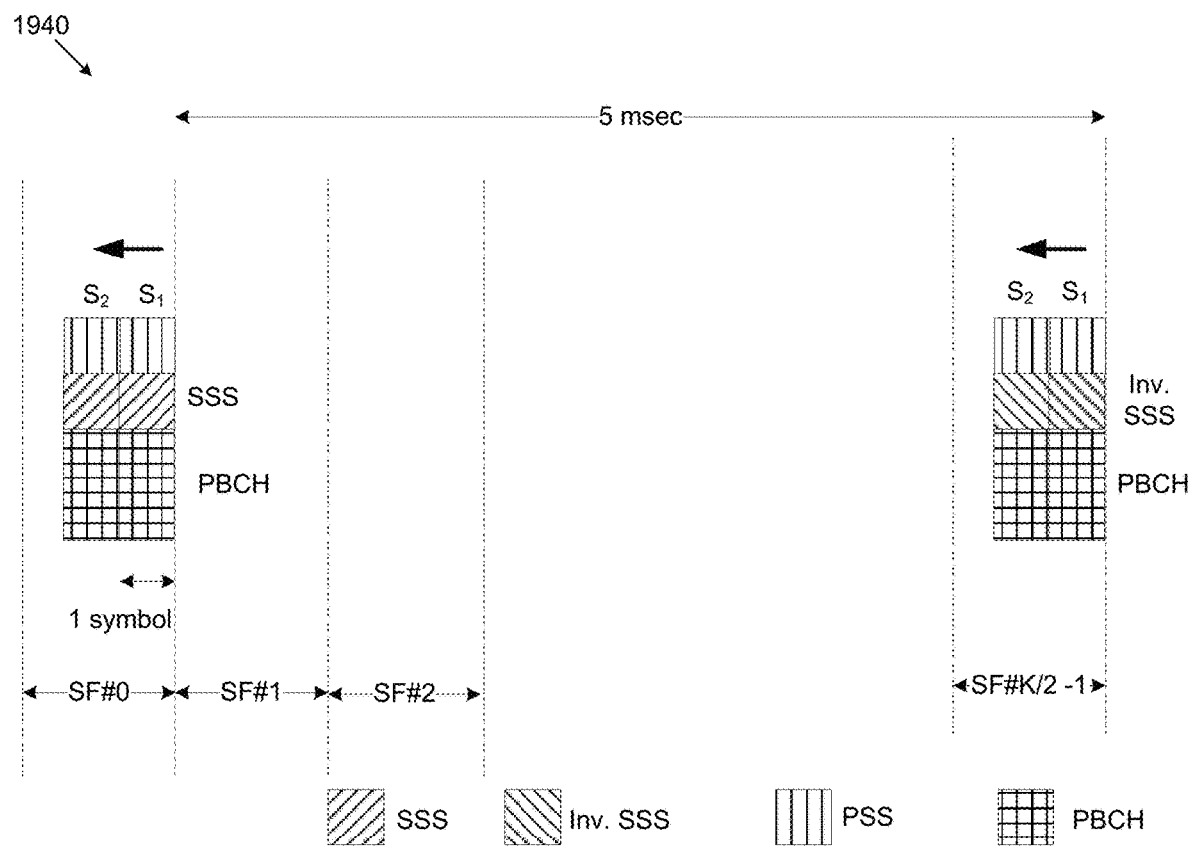
FIG. 19C illustrates an example frame structure where the PSS, SSS and PBCH are frequency division multiplexed according to embodiments of this disclosure.

In another embodiment, there exist scenarios where there is sufficient bandwidth such as in mmWave frequency bands but there is a need to reduce the time overhead for multiple symbol transmission. In such cases, FDM of PSS/SSS/PBCH can be considered. This design also supports beamforming since the same precoding is applied to the corresponding symbols for PSS, SSS and PBCH. FIG. 19C illustrates an example frame structure 1940 where the PSS, SSS and PBCH are frequency division multiplexed. In this case, it makes sense to repeat the PBCH for subsequent transmissions within the frame to keep the total power and bandwidth constant for the transmissions in contrast to the TDM approach presented in this disclosure where the PBCH is transmitted only once per frame. An inverted SSS sequence can still be utilized to indicate the position of the repetition within the frame.

In another embodiment, although multiple numerologies can be supported at the eNB, only a single synchronization signal of a predetermined numerology and using pre-determined resources and periodicity is transmitted by the eNB in a given frequency band. The design of the synchronization signal parameters such as bandwidth and the sequence design can be frequency band specific. An example of frequency band specific synchronization signal numerology is shown in TABLE 2. A UE is configured to only search for a single synchronization signal of a pre-determined numerology in a given frequency band at a given time.

TABLE 2

| Carrier frequency | Sync signal sub-carrier spacing | Number of repetitions in a subframe | Beam-forming support at eNB | Sub-frames per frame | Sub-frame location |
|---|---|---|---|---|---|
| 800 MHz | 3.75 KHz | 8 | N/A | 10 | #1, #5 |
| 2 GHz | 15 KHz | 1 | N/A | 10 | #1, #5 |
| 28 GHz | 60 KHz | 14 | yes | 100 | #1, #50 |
| 70 GHz | 120 KHz | 14 | yes | 200 | #1, #100 |

In one embodiment, to avoid SFN effect, PSS/SSS can be designed with a different (longer) CP length which accommodates SFN effect associated with most scenarios. For instance, the longest CP length available can be used for PSS/SSS. Thus, use of multiple PSS can be avoided. The PBCH can utilize a similar structure.

In one embodiment of the present disclosure, the PSS transmissions within a frame are structured into 2 groups. Group 1: PSS transmissions are made to support eNB and UE beamforming. Group 2: Repetition of group 1 after a specific time interval (5 ms, for example) which is used for coarse timing acquisition, frequency offset estimation and correction.

FIG. 20A illustrates an example where PSS transmission is repeated according to embodiments of this disclosure. A first group of PSS transmissions is made where the PSS transmissions are beamformed for P symbols and then repeated to support UE beamforming after time interval T1. This repetition could be contiguous to the first set (i.e. T1=P, for example). There can be M repetitions of P PSS transmissions within the first group (M>1 to support UE beamforming). The entire group of transmissions is then repeated within a frame at time instant T2 to estimate the coarse timing and frequency offset. T2>>T1 to provide accurate frequency offset for the sync within the frame (T2=5 ms, for example).

The order of eNB and UE beamforming can also be reversed as illustrated in FIG. 20B. A first group of PSS transmissions is made where the PSS transmissions are repeated for M symbols to support UE beamforming and then the eNB changes its beam after time interval T1 P times within the first group. This repetition could be contiguous to the first set (i.e. T1=M, for example, and M>1 to support UE beamforming). The entire group of transmissions is then repeated within a frame at time instant T2 to estimate the coarse timing and frequency offset. T2>>T1 to provide accurate frequency offset for the sync within the frame (T2=5 ms, for example).

Figure 21:
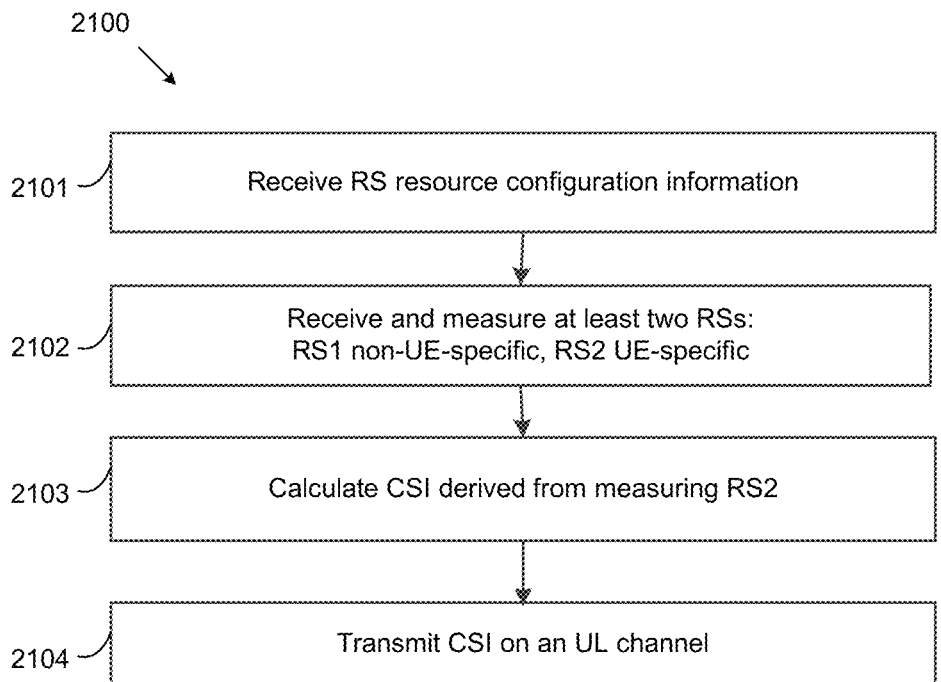
FIG. 21 illustrates a flowchart for an example method wherein a UE receives RS resource configuration information and at least two RS2 according to an embodiment of the present disclosure.

FIG. 21 illustrates a flowchart for an example method 2100 wherein a UE receives RS resource configuration information and at least two RS2 according to an embodiment of the present disclosure. For example, the method 2100 can be performed by the UE 116.

The method 2100 begins with the UE receiving RS resource configuration information (step 2101) and at least two RSs (step 2102), wherein a first RS RS1 is non-UE-specifically configured and a second RS RS2 is UE-specifically configured. For example, the non-UE-specifically configured RS is a RS that is not configured for a specific UE, but rather may be generally applicable to multiple different UEs. In other words, the non-UE-specifically configured RS may be generated and transmitted by an eNB to be measured by multiple different UEs. Additionally, for example, the UE-specifically configured RS is a RS that is configured for a specific UE, such as, configured for UE 116. In other words, the UE-specifically configured RS may be generated and transmitted by an eNB to be measured by a particular UE, such as, UE 116.

Once the RSs are received, the UE measures at least one of the RSs (step 2102). The first RS RS1, non-UE-specifically configured, can be either cell, UE-group, or transmit-receive-point (TRP) specifically configured. Therefore, at least some configuration information about RS1 is received via a broadcast channel. In addition, the first RS can include K≥1 CSI-RS resources. For the second RS RS2, used thereafter to calculate and derive CSI (step 2103), at least some configuration information about RS2 via higher-layer signaling. The calculated CSI is then reported by transmitting it on an uplink channel (step 2104).

Although RS1 is non-UE-specific and RS2 UE-specific, time-frequency patterns associated with RS1 is a subset of time-frequency patterns associated with RS2. Furthermore, a third RS RS3, distinct from RS2, can be further configured as a UE-specific RS.

Figure 22:
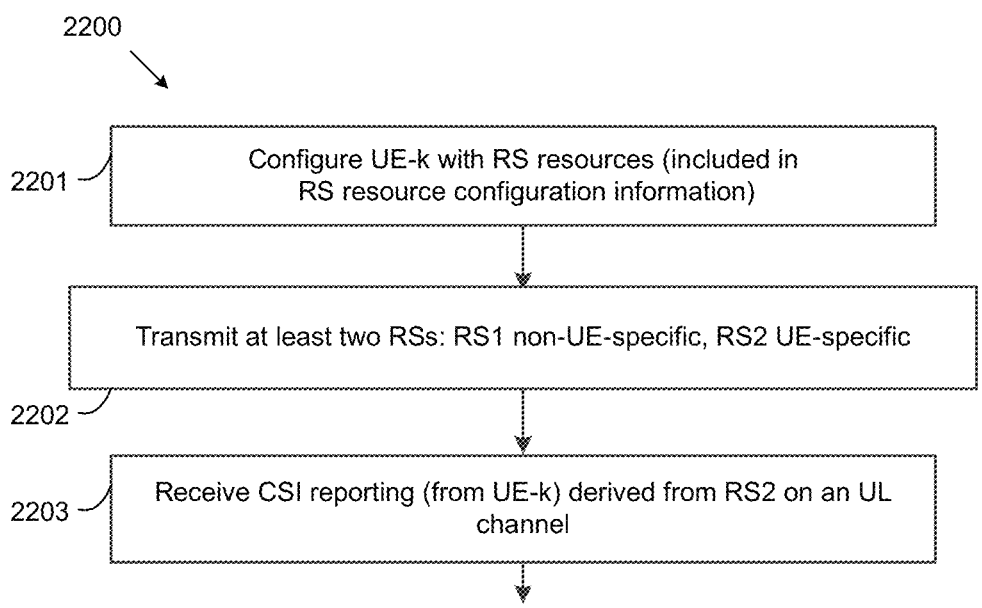
FIG. 22 illustrates a flowchart for an example method wherein a BS configures a UE (labeled as UE-k) with RS resources according to an embodiment of the present disclosure.

FIG. 22 illustrates a flowchart for an example method wherein a BS configures a UE (labeled as UE-k) with RS resources according to an embodiment of the present disclosure. For example, the method 2200 can be performed by the eNB 102.

The method 2200 begins with the BS configuring UE-k with RS resources (step 2201). This information is included in RS resource configuration information. The BS further transmits at least two RSs (step 2202), wherein a first RS RS1 is non-UE-specifically configured and a second RS RS2 is UE-specifically configured. The first RS RS1, non-UE-specifically configured, can be either cell, UE-group, or transmit-receive-point (TRP) specifically configured. Therefore, at least some configuration information about RS1 is received via a broadcast channel. In addition, the first RS can include K≥1 CSI-RS resources. For the second RS RS2, used thereafter to calculate and derive CSI by UE-k, at least some configuration information about RS2 via higher-layer signaling. The BS further receives CSI reporting from UE-k, derived from measuring RS2, on an uplink channel (step 2203).

Although RS1 is non-UE-specific and RS2 UE-specific, time-frequency patterns associated with RS1 is a subset of time-frequency patterns associated with RS2. Furthermore, a third RS RS3, distinct from RS2, can be further configured as a UE-specific RS.

Although FIGS. 21 and 22 illustrate examples of methods for receiving configuration information and configuring a UE, respectively, various changes could be made to FIGS. 21 and 22. For example, while shown as a series of steps, various steps in each figure could overlap, occur in parallel, occur in a different order, occur multiple times, or not be performed in one or more embodiments.

Although the present disclosure has been described with an example embodiments, various changes and modifications can be suggested by or to one skilled in the art. It is intended that the present disclosure encompass such changes and modifications as fall within the scope of the appended claims.

What is claimed:

1. A user equipment (UE) comprising:
a transceiver configured to:
receive, on a broadcast channel, first reference signal (RS) resource configuration information about a first of at least two RSs,
receive, via higher layer signaling, second RS resource configuration information about a second of the at least two RSs, the second RS resource configuration information including configuration information for reporting channel state information (C SI) based on measurement of the second RS, and
receive the at least two RSs; and
a processor operably connected to the transceiver, the processor configured to measure at least one of the at least two RSs; and
wherein the second RS of the at least two RSs is UE-specifically configured and the first RS of the at least two RSs is non-UE-specifically configured and has time-frequency patterns that are a subset of time-frequency patterns associated with the second RS, and
wherein the first RS is UE-group specifically configured.

2. The UE of claim 1, wherein the processor is further configured to:
calculate the CSI derived from measurement of the second RS and
report, via transmission on an uplink channel by the transceiver, the calculated CSI based on the configuration information for reporting CSI included in the second RS resource configuration information.

3. The UE of claim 1, wherein the first RS includes at least two CSI-RS resources.

4. The UE of claim 1, wherein the transceiver is configured to receive a third RS, distinct from the second RS, that is UE-specifically configured.

5. The UE of claim 1, wherein:
the UE-specifically configured second RS is received over a downlink channel on a set of time-frequency resources elements in the downlink channel, and
the non-UE-specifically configured first RS is received over the downlink channel on a subset of the set of time-frequency resources elements for the UE-specifically configured second RS.

6. A base station (BS) comprising:
a processor configured to generate first and second reference signal (RS) resource configuration information for a user equipment (UE) and at least two RSs for the UE; and
a transceiver operably connected to the processor, the transceiver configured to:
transmit, on a broadcast channel to the UE, the first RS resource configuration information about a first of at least two RSs, transmit, via higher layer signaling to the UE, the second RS resource configuration information about a second of the at least two RSs, the second RS resource configuration information including configuration information for reporting channel state information (CSI) based on measurement of the second RS, and transmit, to the UE, the at least two RSs;

wherein the second RS of the at least two RSs is UE-specifically configured and the first RS of the at least two RSs is non-UE-specifically configured and has time-frequency patterns that are a subset of time-frequency patterns associated with the second RS, and wherein the first RS is UE-group specifically configured.

7. The BS of claim 6, wherein the transceiver is further configured to receive, on an uplink channel, channel state information (CSI) derived from measurement of the second RS.

8. The BS of claim 6, wherein the transceiver is configured to transmit a third RS, distinct from the second RS, that UE-specifically configured.

9. The BS of claim 6, wherein:

the UE-specifically configured second RS is transmitted over a downlink channel on a set of time-frequency resources elements in the downlink channel, and the non-UE-specifically configured first RS is transmitted over the downlink channel on a subset of the set of time-frequency resources elements for the UE-specifically configured second RS.

10. A method for operating a user equipment (UE), the method comprising:

receiving, on a broadcast channel by the UE, first reference signal (RS) resource configuration information about a first of at least two RSs;

receiving, via higher layer signaling, second RS resource configuration information about a second of the at least two RSs, the second RS resource configuration information including configuration information for reporting channel state information (CSI) based on measurement of the second RS;

receiving the at least two RSs; and measuring at least one of the at least two RSs, wherein the second RS of the at least two RSs is UE-specifically configured and the first RS of the at least two RSs is non-UE-specifically configured and has time-frequency patterns that are a subset of time-frequency patterns associated with the second RS, and wherein the first RS is UE-group specifically configured.

11. The method of claim 10, further comprising:

calculating the CSI derived from measurement of the second RS; and reporting, via transmission on an uplink channel by the UE, the calculated CSI based on the configuration information for reporting CSI included in the second RS resource configuration information.

12. The method of claim 10, wherein the first RS includes at least two CSI-RS resources.

13. The method of claim 10, further comprising receiving a third RS, distinct from the second RS, that is UE-specifically configured.

14. The method of claim 10, wherein:

the UE-specifically configured second RS is received over a downlink channel on a set of time-frequency resources elements in the downlink channel, and the non-UE-specifically configured first RS is received over the downlink channel on a subset of the set of time-frequency resources elements for the UE-specifically configured second RS.

\* \* \* \* \*